(12) United States Patent
Suda

(10) Patent No.: US 7,233,359 B2
(45) Date of Patent: Jun. 19, 2007

(54) IMAGE SENSING APPARATUS HAVING IMAGE SIGNALS GENERATED FROM LIGHT BETWEEN OPTICAL ELEMENTS OF AN OPTICAL ELEMENT ARRAY

(75) Inventor: Yasuo Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 10/733,421

(22) Filed: Dec. 10, 2003

(65) Prior Publication Data

US 2004/0125230 A1 Jul. 1, 2004

(30) Foreign Application Priority Data

Dec. 13, 2002 (JP) ............................. 2002-363117

(51) Int. Cl.
*G03B 13/00* (2006.01)
(52) U.S. Cl. ..................... 348/349; 348/360; 348/335
(58) Field of Classification Search ................ 348/349, 348/360, 335, 345, 352–356; 250/208.2
See application file for complete search history.

(56) References Cited

U.S. PATENT DOCUMENTS

| 4,410,804 A | * | 10/1983 | Stauffer .................... 250/208.2 |
| 4,542,983 A | * | 9/1985 | Zambelli et al. .............. 355/55 |
| 4,653,911 A | * | 3/1987 | Fortin ......................... 356/153 |
| 5,083,150 A | * | 1/1992 | Nagasaki et al. ............. 396/49 |
| 5,257,133 A | * | 10/1993 | Chen ........................... 359/565 |
| 5,379,282 A | * | 1/1995 | Wachi ...................... 369/44.35 |
| 5,675,149 A | * | 10/1997 | Wood et al. ................. 250/332 |
| 5,686,960 A | * | 11/1997 | Sussman et al. ......... 348/218.1 |
| 6,057,538 A | * | 5/2000 | Clarke ..................... 250/208.1 |
| 6,987,258 B2 | * | 1/2006 | Mates ..................... 250/208.1 |
| 2002/0113866 A1 | * | 8/2002 | Taniguchi et al. ............ 348/51 |

FOREIGN PATENT DOCUMENTS

| JP | 1-215406 | 8/1989 |
| JP | 5-88445 | 4/1993 |
| JP | 7-168125 | 7/1995 |
| JP | 11-119089 | 4/1999 |
| JP | 11-119089 A | 4/1999 |
| JP | 2001-215406 A | 8/2001 |

* cited by examiner

*Primary Examiner*—David Ometz
*Assistant Examiner*—Usman Khan
(74) *Attorney, Agent, or Firm*—Morgan & Finnegan, LLP

(57) ABSTRACT

It is an object of this invention to realize an image sensing apparatus which satisfies both the requirements for focus detection performance and high-resolution, high image quality. In order to achieve this object, there is provided an image sensing apparatus characterized by comprising an image sensing device having a plurality of pixels, an optical element array having a plurality of optical elements made to correspond one by one to each set of a plurality number of pixels of a plurality of pixels of the image sensing device, and a focusing device which generates, for each of the plurality of optical elements, one pair of focus detection signals in the pixels from light passing through the optical element, and performs focusing operation on the basis of focus detection signals generated in pairs for each of the optical elements.

4 Claims, 21 Drawing Sheets

FIG. 11

| G | B | G | B | G | B | G | B |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |

256

IMAGE SENSING APPARATUS HAVING IMAGE SIGNALS GENERATED FROM LIGHT BETWEEN OPTICAL ELEMENTS OF AN OPTICAL ELEMENT ARRAY

FIELD OF THE INVENTION

The present invention relates to an image sensing device and, more particularly, to an image sensing apparatus having a focus detection function in addition to an image sensing function using an image sensing device.

BACKGROUND OF THE INVENTION

In a digital camera, in response to the pressing of the release button, an image sensing device such as a CCD or CMOS sensor is exposed to an object image for a desired period of time. The resultant image signal representing a still image of one frame is converted into a digital signal. Predetermined processing such as YC processing is then performed for the digital signal to obtain an image signal in a predetermined form. Digital image signals representing sensed images are recorded on a semiconductor memory in correspondence with the respective images. The recorded image signals are read out as needed to be displayed or converted into printable signals. Alternatively, such signals are output to a display apparatus to be displayed.

Conventionally, a digital camera performs focus detection by using an output from an image sensing device. In this case, focus detection is performed by a contrast detection scheme. In focus adjustment based on the contrast detection scheme, the sharpness of an object image formed by an image sensing optical system is obtained by evaluating an output from the image sensing device by a predetermined function, and the position of the image sensing optical system on the optical axis is adjusted such that the function value takes an extreme value.

Evaluation functions include, for example, a function that adds the absolute values of the differences between adjacent luminance signals within a focus detection area, a function that adds the squared differences between adjacent luminance signals within a focus detection area, and a function that similarly processes the differences between adjacent signals of R, G, and B image signals.

In general, in focus detection based on such a contrast detection scheme, since evaluation function values are obtained while the position of an image sensing optical system on the optical axis is slightly moved, it requires a considerable time to perform focus adjustment until an in-focus state is obtained.

Japanese Patent Laid-Open No. 2001-215406 discloses an arrangement in which the photodetection surface of an image sensing device is stepped to realize high-speed direction determination in focus control. More specifically, a plurality of image signals are acquired by setting slightly different optical path lengths, and a focusing direction is determined on the basis of the acquired image signals. The photographing lens is then moved in the determined focusing direction up to the in-focus position. However, this scheme includes both pixels with short optical path lengths and pixels with long optical path lengths and hence is not suited to an apparatus aiming at obtaining high-quality images. Although the image quality improves as the optical path length differences between pixels with short optical path lengths and pixels with long optical path lengths are reduced, it becomes difficult to perform direction determination in focus control. It is therefore impossible to realize both high-speed focus control and high image quality.

On the other hand, as disclosed in U.S. Pat. No. 4,410,804, an image sensing apparatus incorporating a focus detection device based on a so-called phase difference detection scheme is also available, in which one or two pairs of light-receiving units are provided for each two-dimensional arranged microlens array, and the light-receiving units are projected onto the pupil of an image sensing optical system by using the microlenses, thereby dividing the pupil. In the phase difference detection scheme, an object image is formed by using two light beams passing through different portions of the pupil of the image sensing optical system, and the positional phase difference between the two objective images is detected on the basis of outputs from an image sensing device. This phase difference is then converted into a defocus amount of the image sensing optical system.

In focus detection based on the phase difference detection scheme, since a defocus amount can be obtained, the time required to obtain an in-focus state can be greatly shortened as compared with the contrast detection scheme.

In the image sensing device having the structure disclosed in U.S. Pat. No. 4,410,804, since one or two pairs of images formed by light beams passing through portions of the pupil of the image sensing optical system are output, these images have very low quality when evaluated in terms of image sensing performance for object images. The main cause for this is that in an out-of-focus background or foreground, unnatural image blur is caused by decentered light beams.

In order to eliminate such unnatural blur, there is available a method of combining one or two pairs of images formed by using portions of the pupil to obtain an image using all light beams passing through the pupil of the image sensing optical system in a pseudo manner. However, since signals are combined after they are output from the image sensing device, noise level is high due to amplifiers inside and outside the image sensing device. It is therefore difficult to obtain a high-quality image with a high S/N ratio similar to that of an image obtained by an image sensing device designed to obtain an image using all light beams passing through the pupil of the image sensing optical system.

Japanese Patent Laid-Open No. 07-168125 discloses an arrangement including a liquid crystal spatial optical modulator having a plurality of pixels between the microlenses and the photodetection surface of an image sensing device and is designed to form a three-dimensional image. This arrangement includes a spatial optical modulator which blocks the optical path between a microlens and a light-receiving unit of the image sensing device, and a control circuit which selectively causes light to be transmitted through only a given segment of the spatial optical modulator, thereby making the spatial optical modulator function as a shutter.

This arrangement indicates that images based on light beams passing through portions of the pupil of the photographing lens and images formed by using all light beams can be switched. However, since light is absorbed by the spatial optical modulator constituted by a liquid crystal layer and a polarizer, only an object with sufficient brightness can be captured.

Japanese Patent Laid-Open No. 11-119089 discloses a technique of using a single image sensing device both for image sensing operation and focus detection by extending and retracting a re-imaging optical system in and from a mirror box in a single-lens reflex camera. According to this technique, although high-speed focus adjustment can be performed by the phase difference detection scheme, a large retraction space and large energy are required to allow the large-size re-imaging optical system to move at high speed, resulting in an increase in the size of image sensing equipment.

SUMMARY OF THE INVENTION

The present invention has been made in consideration of the above problems in the prior art, and has as its object to realize an image sensing apparatus which satisfies both the requirements for focus detection performance and high-resolution, high image quality.

It is another object of the present invention to realize an image sensing apparatus which can concurrently perform focus detection operation and image display operation by using a single image sensing device.

It is still another object of the present invention to realize a compact image sensing apparatus.

In order to solve the above problems and achieve the above objects, there is provided an image sensing apparatus comprising an image sensing device having a plurality of pixels, an optical element array having a plurality of optical elements made to correspond one by one to each set of a plurality number of pixels of a plurality of pixels of the image sensing device, and a focusing device which generates, for each of the plurality of optical elements, one pair of focus detection signals in the pixels from light passing through the optical element, and performs focusing operation on the basis of focus detection signals generated in pairs for each of the optical elements.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 11 is a view for explaining a Beyer arrangement;

DETAILED DESCRIPTION OF THE PREFERRED EMBODIMENTS

Figure 1:
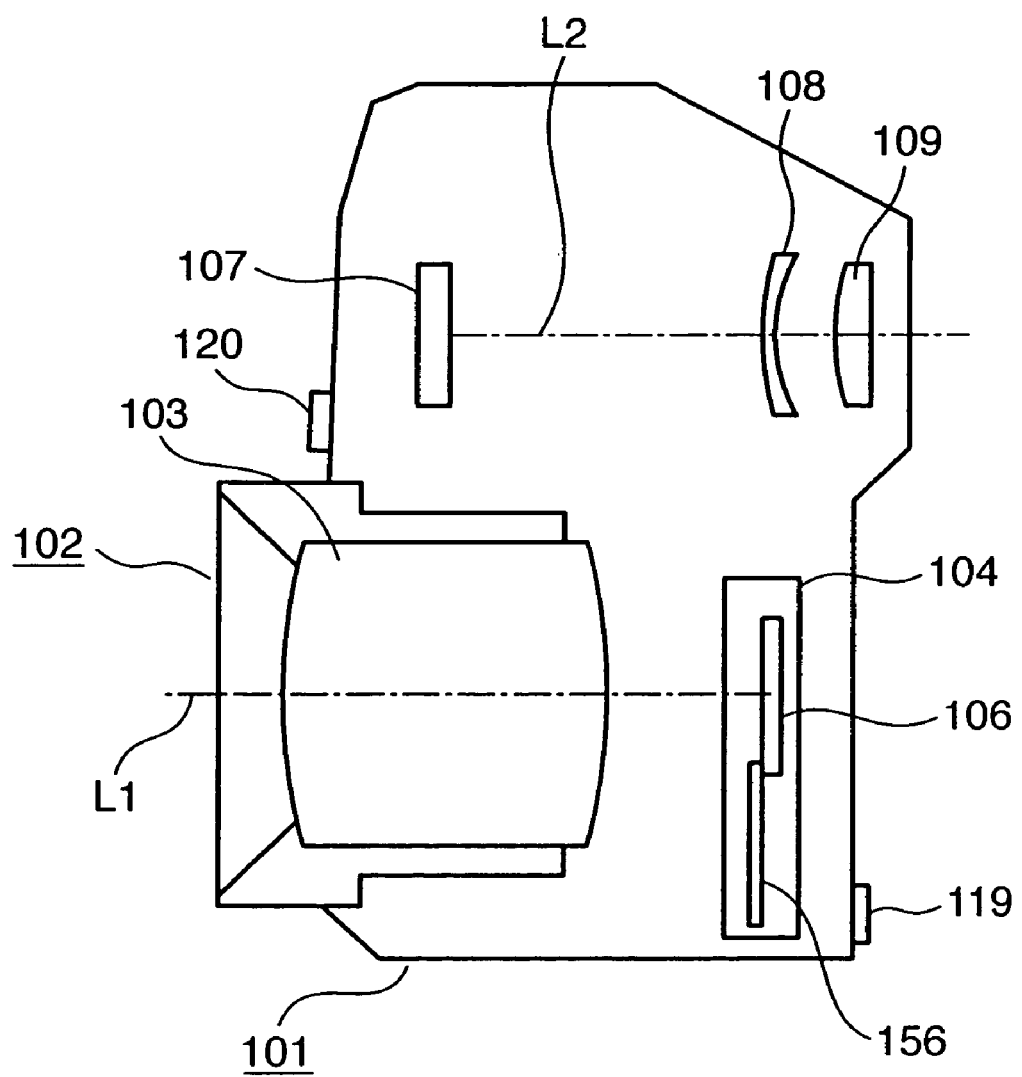
FIG. 1 is a view showing the schematic arrangement of a digital color camera according to an embodiment of the present invention.

The preferred embodiments of the present invention will be described below.

An outline of each embodiment will be described first.

An image sensing apparatus of each embodiment is an image sensing apparatus including an image sensing device having a plurality of pixels arranged. This apparatus includes an optical element array in which a plurality of optical elements incorporating the plurality of pixels of the image sensing device are juxtaposed. The apparatus obtains a pair of image sensing device signal outputs based on light beams received through the optical elements of the optical element array for each set of a plurality of optical elements, and generates a focus detection signal on the basis of the signal outputs.

In this arrangement, a pair of image sensing device signal outputs based on light beams received through the optical elements of the optical element array for each set of a plurality of optical elements are obtained, and a focus detection signal is generated on the basis of the signal outputs. This arrangement makes it possible to satisfy both the requirements for high focus detection performance and high-resolution, high image quality by using a single image sensing device. In addition, a compact image sensing apparatus can be realized.

The image sensing apparatus according to each embodiment is an image sensing apparatus including an image sensing device having a plurality of pixels arranged. When light beams are received through an optical element array constituted by a plurality of optical elements incorporating a plurality of pixels of the image sensing device, an image signal is formed on the basis of pixel outputs received through the gaps between a plurality of optical elements formed in the optical element array.

In this arrangement, an image signal is formed on the basis of pixel outputs received through the gaps between a plurality of optical elements formed in the optical element array. This makes it possible to concurrently perform display operation for monitoring a photographed image and focus detection operation.

In each embodiment, the above optical element array is formed by juxtaposing a plurality of re-imaging optical systems.

In this arrangement, since a plurality of re-imaging optical systems are juxtaposed in the optical element array, high-speed focus detection based on the phase difference detection scheme can be realized. In addition, since the optical element array is small in size, a large mechanism space is not required. When the optical element array is retracted, high image quality can be obtained by using all the pixels of the image sensing device.

In each embodiment, the apparatus can be switched between the first optical arrangement state, in which the image sensing device receives light without through the optical element array constituted by a plurality of optical elements incorporating a plurality of pixels of the image sensing device, and the second optical arrangement state, in which the image sensing device receives light through the optical element array.

In this arrangement, since the first optical arrangement state and second optical arrangement state can be switched, an image sensing apparatus can be realized, which can satisfy both the requirements for focus detection performance and image quality by using a single image sensing device.

In this embodiment, a focus detection signal is generated by using a pair of image sensing device signal output value arrays in which signal outputs change in accordance with the imaging state of the imaging optical system which forms an object image on the image sensing device.

In this arrangement, since a focus detection signal is generated by using a pair of image sensing device signal output value arrays in which signal outputs change in accordance with the imaging state of the imaging optical system which forms an object image on the image sensing device, high-speed focus detection based on the phase difference detection scheme can be realized.

In addition, in each embodiment, a focus detection signal is formed by using a signal output value array obtained by concatenating output values from a plurality of pixels, of the plurality of pixels of the image sensing device, which are positioned discretely.

In this arrangement, since a focus detection signal is formed by using a signal output value array obtained by concatenating output values from a plurality of pixels, of the plurality of pixels of the image sensing device, which are positioned discretely, high focus detection performance can be obtained by having a sufficiently large focus detection visual field while a reduction in the size of a mechanism for focus detection is achieved.

The embodiments of the present invention will be described in detail below.

First Embodiment

FIG. 1 is a view showing the schematic arrangement of a digital color camera which is image sensing equipment incorporating an image sensing apparatus according to the first embodiment of the present invention. This camera is a single-CCD digital color camera which uses an image sensing device such as a CCD or CMOS sensor. The camera obtains an image signal representing a moving or still image by continuously or sporadically driving the image sensing device. In this case, the image sensing device is an area sensor of a type that converts exposure light into an electrical signal for each pixel, stores electric charges corresponding to the light amount, and outputs the electric charges.

Referring to FIG. 1, reference numeral 101 denotes a camera body; and 102, a detachable photographing lens incorporating an imaging optical system 103. The photographing lens 102 is electrically and mechanically connected to the camera body 101 through a known mount. Photographed frames with various field angles can be obtained by interchanging photographing lenses with different focal lengths. The photographing lens 102 has a driving mechanism (not shown) and is focused on an object by moving a focusing lens as an element of the imaging optical system 103 along an optical axis L1 or forming a focusing lens using a transparent, elastic member with flexibility or a liquid lens and changing its refractive power by changing its interface form.

Reference numeral 106 denotes an image sensing device. An optical low-pass filter (not shown) which limits the cutoff frequency of the imaging optical system 103 so as not to form excessively high spatial frequency components of an object image on the image sensing device 106 is provided in an optical path from the imaging optical system 103 to the image sensing device 106. An infrared cut filter is also placed in the imaging optical system 103.

A lens array plate 156 is retractably placed in front of the light-receiving surface of the image sensing device 106. The lens array plate 156 is housed, together with a linear ultrasonic motor (to be described later), in a package 104 which allows effective capturing of light without the entrance of dust and moisture from the outside. The lens array plate 156 has a size that makes it possible to cover the entire surface of the image sensing device 106 when the plate is inserted to a position before the image sensing device 106. Note that the lens array plate 156 can also be called an optical element array.

The object image captured by the image sensing device 106 is displayed on a display apparatus 107. The display apparatus 107 is preferably formed from an organic EL spatial modulation device, liquid crystal spatial modulation device, a spatial modulation device using electrophoresis of particles, digital micro-mirror device, or the like because they are low in power consumption.

The image sensing device 106 is a CMOS process compatible sensor (to be simply referred to as a CMOS sensor hereinafter) which is one of amplification type solid-state image sensing devices. One of the characteristic features of the CMOS sensor is that the number of masks and the number of process steps can be greatly decreased as compared with a CCD because MOS transistors in an area sensor unit and MOS transistors in a peripheral circuit can be formed in the same step. Another characteristic feature of this sensor is that it allows random access to an arbitrary pixel. Therefore, the sensor facilitates reading of a signal limited to a focus detection visual field or a signal removed by decimation for display.

The image sensing device 106 performs focus detection operation, display image output operation, and high-resolution image output operation by using such characteristic features.

Reference numerals 108 and 109 denote a concave lens and convex lens, respectively, which are used for the observation of the display apparatus 107. These lenses have positive power as a whole and constitute a finder optical system. The diopter is adjusted by moving the convex lens

109 along a finder optical axis L2 to provide an observer with optimal visibility of the display apparatus 107.

Reference numeral 119 denotes a main switch, and 120, a release button.

Figure 2:
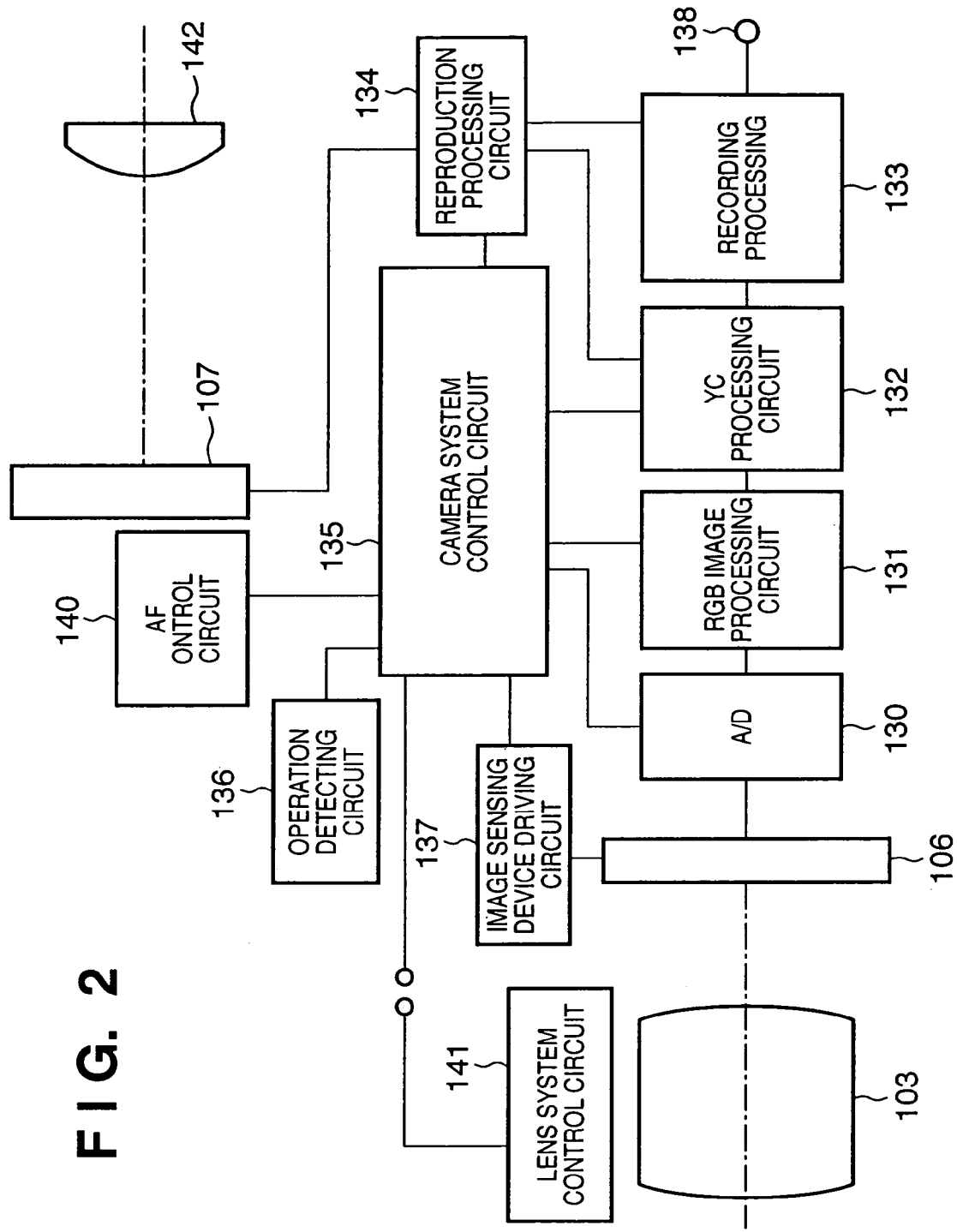
FIG. 2 is a block diagram showing the electrical arrangement of a digital color camera.

FIG. 2 is a block diagram showing the electrical arrangement of the digital color camera.

A portion of the camera which is associated with image sensing operation and recording operation will be described first. The camera has an image sensing system, image sensing system, recording/reproducing system, and control system. The image sensing system includes the imaging optical system 103 and image sensing device 106. The image processing system includes an A/D converter 130, RGB image processing circuit 131, and YC processing circuit 132. The recording/reproducing system includes a recording processing 133 and reproduction processing circuit 134. The control system includes a camera system control circuit 135, operation detecting circuit 136, and image sensing device driving circuit 137. Reference numeral 138 denotes a connection terminal which is standardized to be connected to an external computer or the like and transmit/receive data. These electric circuits are driven by a compact fuel cell (not shown).

The image sensing system is an optical processing system which forms an image on the image sensing plane of the image sensing device 106 through the imaging optical system 103. This system exposes the image sensing device 106 to an object image with a proper amount of light by adjusting the stop (not shown) of the photographing lens 102 and also adjusting a mechanical shutter (not shown) as needed. As the image sensing device 106, an image sensing device having 3,700 square pixels in the long side direction and 2,800 square pixels in the short side direction, i.e., a total of about 1,000,000 pixels is used. R (Red), G (Green), and B (Blue) color filters are alternately arranged for the respective pixels to form a so-called Beyer arrangement with four pixels constituting one combination, as shown in FIG. 11.

In the Beyer arrangement, G pixels which tend to be sensed strongly by the observer when he/she sees an image are arranged more in number than R and B pixels to improve the overall image performance. In general, in image processing which uses an image sensing device based on this scheme, luminance signals are mainly generated from G, and chrominance signals are generated from R, G, and B.

Each image signal read from the image sensing device 106 is supplied to the image processing system through the A/D converter 130. The A/D converter 130 is a signal conversion circuit which converts each image signal into a signal corresponding to the amplitude of the signal from the corresponding exposed pixel, e.g., a 10-bit digital signal, and outputs it. The subsequent image signal processing is executed by digital processing.

The image processing system is a signal processing circuit which obtains an image signal in a desired form from R, G, and B digital signals. This circuit converts R, G, and B chrominance signals into a YC signal represented by a luminance signal Y and color difference signals R-Y and B-Y or the like.

The RGB image processing circuit 131 is a signal processing circuit which processes a 3,700×2,800-pixel image signal received from the image sensing device 106 through the A/D converter 130, and includes a white balance circuit, a gamma correction circuit, and an interpolation computation circuit which increases the resolution of an image by interpolation computation.

The YC processing circuit 132 is a signal processing circuit which generates a luminance signal Y and color difference signals R-Y and B-Y. This circuit is comprised of a high-frequency luminance signal generating circuit which generates a high-frequency luminance signal YH, a low-frequency luminance signal generating circuit which generates a low-frequency luminance signal YL, and a color difference signal generating circuit which generates the color difference signals R-Y and B-Y. The luminance signal Y is formed by combining the high-frequency luminance signal YH and low-frequency luminance signal YL.

The recording/reproducing system is a processing system which outputs an image signal to a memory and outputs an image signal to the display apparatus 107. The recording processing 133 writes and reads image signal in and from the memory. The reproduction processing circuit 134 reproduces the image signal read out from the memory and outputs the signal to the display apparatus 107.

The recording processing circuit 133 incorporates a compression/decompression circuit which compresses a YC signal representing a still or moving image into a signal in a predetermined compression form, and decompresses compressed data when it is read out. The compression/decompression circuit includes a frame memory for signal processing. This circuit stores YC signals from the image processing system in the frame memory on a frame basis, and reads out signals for each set of a plurality of blocks to compress/code. Compression/coding is performed by, for example, performing two-dimensional quadrature transformation, normalization, and Huffman coding with respect to image signals on a block basis.

The reproduction processing circuit 134 is a circuit which matrix-converts the luminance signal Y and the color difference signals R-Y and B-Y into, for example, an RGB signal. The signal converted by the reproduction processing circuit 134 is output to the display apparatus 107 to display/play back a visible image. The reproduction processing circuit 134 may be connected to the display apparatus 107 through a radio communication means such as Bluetooth. This arrangement makes it possible to monitor an image sensed by the digital color camera from a remote place.

The control system includes the operation detecting circuit 136 which detects the operation of the release button 120 or the like, the camera system control circuit 135 which controls each unit including the position of the lens array plate 156 in accordance with the detection signal and generates and outputs a timing signal for image sensing operation, and the image sensing device driving circuit 137 which generates a driving signal for driving the image sensing device 106 under the control of the camera system control circuit 135.

The control system controls the image sensing system, image processing system, and recording/reproducing system in accordance with external operation. For example, upon detecting the pressing of the release button 120, the control system controls driving of the image sensing device 106, the operation of the RGB image processing circuit 131, compression processing in the recording processing 133, and the like.

A portion associated with focus adjustment will be described next. An AF control circuit 140 and lens system control circuit 141 are also connected to the camera system control circuit 135. These circuits communicate data necessary for each processing with each other through the camera system control circuit 135.

The AF control circuit 140 obtains an image sensing device signal output in the focus detection visual field set at an arbitrary position on a photographing frame, generates a focus detection signal on the basis of the signal output, and detects an imaging state. Upon detecting a defocus amount, the AF control circuit 140 converts it into a driving amount of the focusing lens as an element of the imaging optical system 103, and transmits the driving amount to the lens system control circuit 141 through the camera system control circuit 135. With respect to a moving object, the AF control circuit 140 indicates a focusing lens driving amount based on the result obtained by predicting a proper lens position in consideration of the time lag between the instant at which the release button 120 is pressed and the instant at which actual image sensing control is started. Upon determining that the luminance of an object is too low to obtain sufficient focus detection precision, the AF control circuit 140 illuminates the object with a white LED or fluorescent tube (not shown).

Upon reception of the focusing lens driving amount, the lens system control circuit 141 focuses the camera on the object by, for example, moving the focusing lens along the optical axis L1 using a driving mechanism (not shown) for the photographing lens 102.

When the AF control circuit 140 detects that the camera is focused on the object, the corresponding information is sent to the camera system control circuit 135. When the release button 120 is pressed at this time, image sensing control is performed by the image sensing system, image processing system, and recording/reproducing system as described above.

Figure 3:
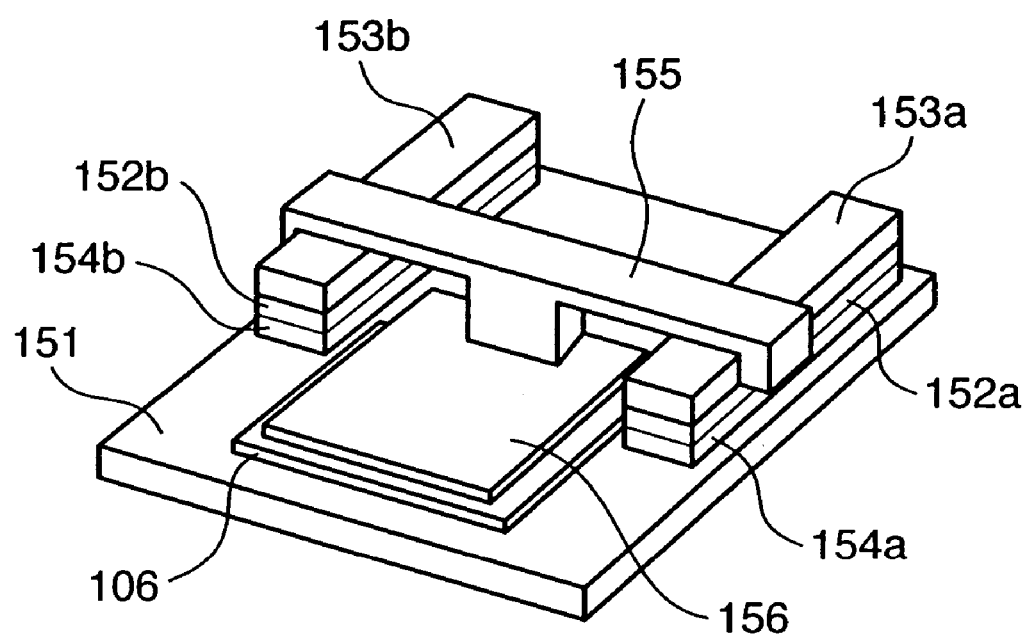
FIG. 3 is a perspective view showing the arrangement of an image sensing unit.

FIG. 3 is a perspective view showing the arrangement of part of the image sensing apparatus according to the first embodiment.

The image sensing apparatus includes the image sensing device 106, the lens array plate 156 driven by a linear ultrasonic motor, and an electrical circuit which generates an image signal and focus detection signal. Of these components, the image sensing device 106 and lens array plate 156 are housed in the package 104 having a window through which light is received, as described above.

The linear ultrasonic motor extends and retracts the lens array plate 156 onto and from the image sensing device 106 to switch between the first optical arrangement state, in which a light beam from the imaging optical system 103 is caused to be directly incident on the image sensing device 106, and the second optical arrangement state, in which a light beam is caused to be incident on the image sensing device 106 upon being transmitted through the lens array plate 156. The first optical arrangement state is used to generate a high-resolution image suitable for a large-size print or the like. The second optical arrangement state is used to generate a signal for focus detection and an image signal with a relatively small amount of data for display. The lens array plate 156 is a thin plate having a size that allows it to cover the front surface of the image sensing device 106, and hence can realize a very compact image sensing apparatus. In addition, the image sensing device 106 itself requires no special structure and hence can be easily obtained at a low price.

The linear ultrasonic motor is configured such that piezoelectric vibrators 152a and 152b formed from rectangular parallelepiped ceramic members are arranged parallel on a substrate 151, metal vibrators 153a and 153b are stacked on the piezoelectric vibrators 152a and 152b, and electrodes 154a and 154b are arranged under the piezoelectric vibrators 152a and 152b such that they are overlaid parallelly on the piezoelectric vibrators 152a and 152b to be mounted in tight contact therewith. A movable portion 155 which is made of polyphenylene sulfide resin and serves as a support member for the lens array plate 156 is supported across the vibrators 153a and 153b so as to be linearly movable in only the longitudinal direction of the vibrators 153a and 153b. The two ends of the movable portion 155 are bent toward the vibrators 153a and 153b in the form of a hook so as not to come off the vibrators 153a and 153b.

The image sensing device 106 is placed between the piezoelectric vibrators 152a and 152b on the substrate 151, and the lens array plate 156 supported on the movable portion 155 faces the image sensing device 106 at a distance of several μm to several 100 μm.

Lens array plate driving operation in the image sensing apparatus having the above arrangement will be described.

Figure 4:
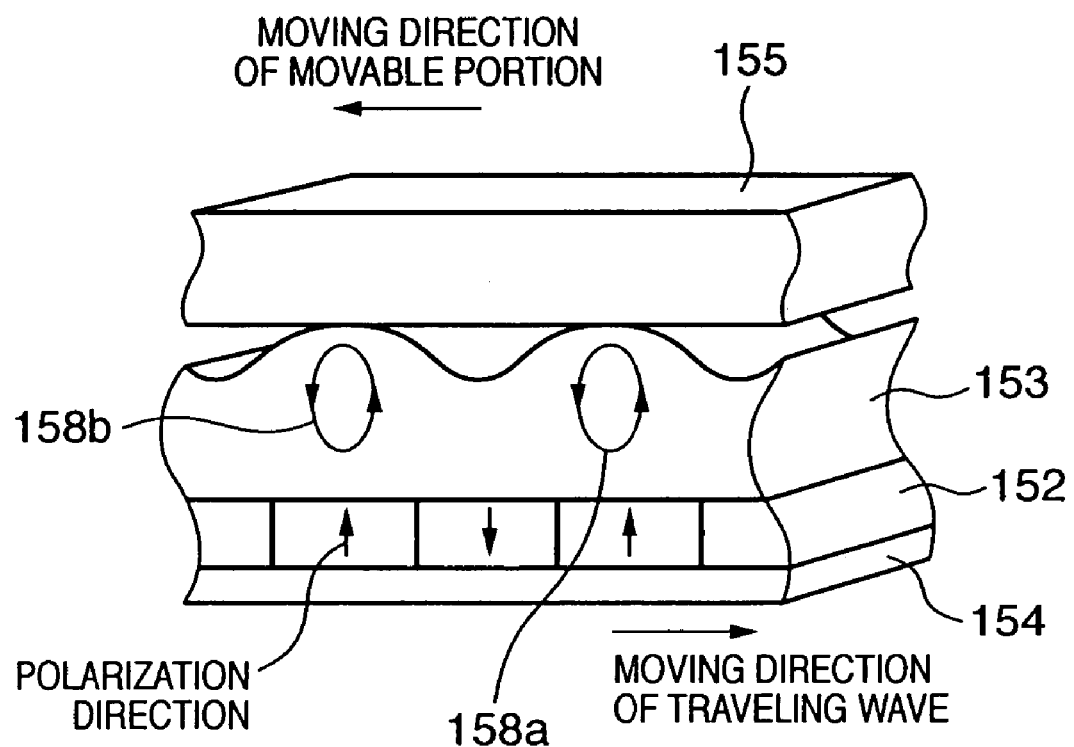
FIG. 4 is a perspective view showing a contact surface between a vibrator and a movable portion of a linear ultrasonic motor during operation.

FIG. 4 is a perspective view showing a contact surface between a vibrator and the movable portion of the linear ultrasonic motor during operation.

A piezoelectric vibrator 152 is polarized into several separate poles to have alternately opposite polarization directions. When a voltage is applied to an electrode 154 and vibrator 153 which are joined to the piezoelectric vibrator 152 in tight contact, distortion is produced inside the piezoelectric vibrator 152 due to the difference in polarization direction, and transmitted to the vibrator 153. Continuously performing this operation while changing the direction of distortion will produce vibrations in the vibrator 153. This in turn excites a traveling wave and ultrasonic vibrations 158a and 158b. The ultrasonic vibrations 158a and 158b then serve as driving power to move the movable portion 155 through a frictional force. At this time, since the moving direction of the traveling wave is opposite to the rotating direction of the ultrasonic vibrations 158a and 158b, the movable portion 155 moves in a direction opposite to the moving direction of the traveling wave.

In general, a linear ultrasonic motor has a high torque and hence has a fast response characteristic. This motor can therefore efficiently move the lens array plate 156 supported by the movable portion 155 at high speed.

A main photographing sequence in the digital color camera having the above arrangement will be described below.

(1) The main switch 119 is turned on.

(2) The camera system control circuit 135 controls the position of the lens array plate 156 to set the second optical arrangement state.

(3) A monitor image is displayed on the display apparatus 107 by using the image sensing system, image processing system, and recording/reproducing system.

(4) The image sensing system, AF control circuit 140, and lens system control circuit 141 control the focusing lens of the imaging optical system to focus the camera.

(5) When the operation detecting circuit 136 detects that the release button 120 is pressed, the camera system control circuit 135 controls the position of the lens array plate 156 to set the first optical arrangement state.

(6) The image sensing system and image processing system capture a high-resolution image.

(7) The flow of processing returns to (2).

According to the above arrangement and the above photographing sequence, focus adjustment, monitoring of a sensed image on the display apparatus, and image sensing of a high-resolution image can be performed by using signals from a single image sensing device. In addition, high-speed focus adjustment based on the phase difference detection scheme can be realized simultaneously with uniformity in field of depth with respect to optical images on the image monitor, a small time lag, and smooth moving image display.

The structure of the image sensing device 106 will be described next.

Figure 5:
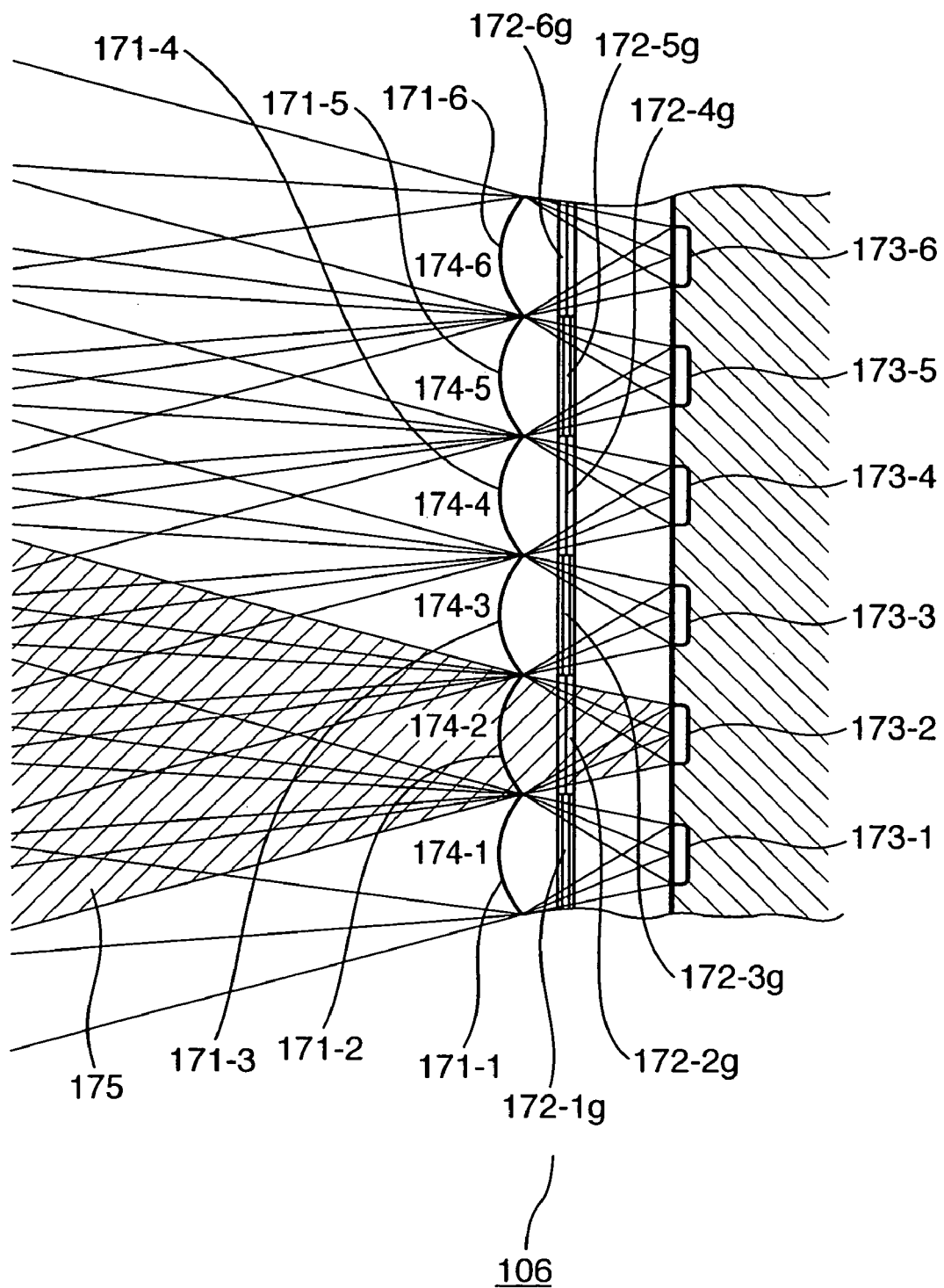
FIG. 5 is a sectional view of an image sensing device.

FIG. 5 is a sectional view of the image sensing device 106 taken in the direction to cross the pixel array at 45°. FIG. 5 shows the first optical arrangement state in which light beams from the imaging optical system are directly incident on the image sensing device 106. The imaging optical system 103 is located on the left side in FIG. 5, and pixels 174-1, 174-2, 174-3, 174-4, 174-5, and 174-6 are densely arrayed on the image sensing device 106.

Each pixel of the image sensing device 106 is constituted by a set of a microlens, color filter, and light-receiving unit.

Light beams emerging from the imaging optical system 103 are incident on microlenses 171-1, 171-2, 171-3, 171-4, 171-5, and 171-6 through optical low-pass filters (not shown). Color filters are arranged behind the respective microlenses. Only light components in desired wavelength ranges are selected by these color filters and reach light-receiving units 173-1 to 173-6. There are three types of color filters, i.e., R, G, and B color filters. Since this device has the Beyer arrangement as described above, only one type of color filters appear on this cross-section. In the case shown in FIG. 5, green transmission color filters 172-1g, 172-2g, 172-3g, 172-4g, 172-5g, and 172-6g appear.

The refractive powers of the respective microlenses are set to project the respective light-receiving units 173-1, 173-2, 173-3, 173-4, 173-5, and 173-6 of the image sensing device onto the exit pupil of the imaging optical system 103. In this case, a projection magnification is preferably set to make a projection image of each light-receiving unit larger than the exit pupil of the imaging optical system 103 at full aperture so as to set an almost linear relationship between the amount of light incident on the light-receiving unit and the aperture area of the stop of the imaging optical system 103. In the first optical arrangement state, as a received light beam is represented by a hatched portion 175 with respect to the pixel 174-2, a high-resolution, high-quality image output can be obtained by the light beam passing through the entire exit pupil of the imaging optical system 103.

Note that when a fine pyramidal periodic structure having a smaller pitch than the wavelength of visible light is formed on the surface of each microlens to make it function as a so-called photonic crystal, the utilization efficiency of light can be improved by reducing surface reflections of light due to the refractive index difference between air and the microlens.

The second optical arrangement state in which images with small data amounts are output for focus detection processing and display operation will be described next.

Figure 6:
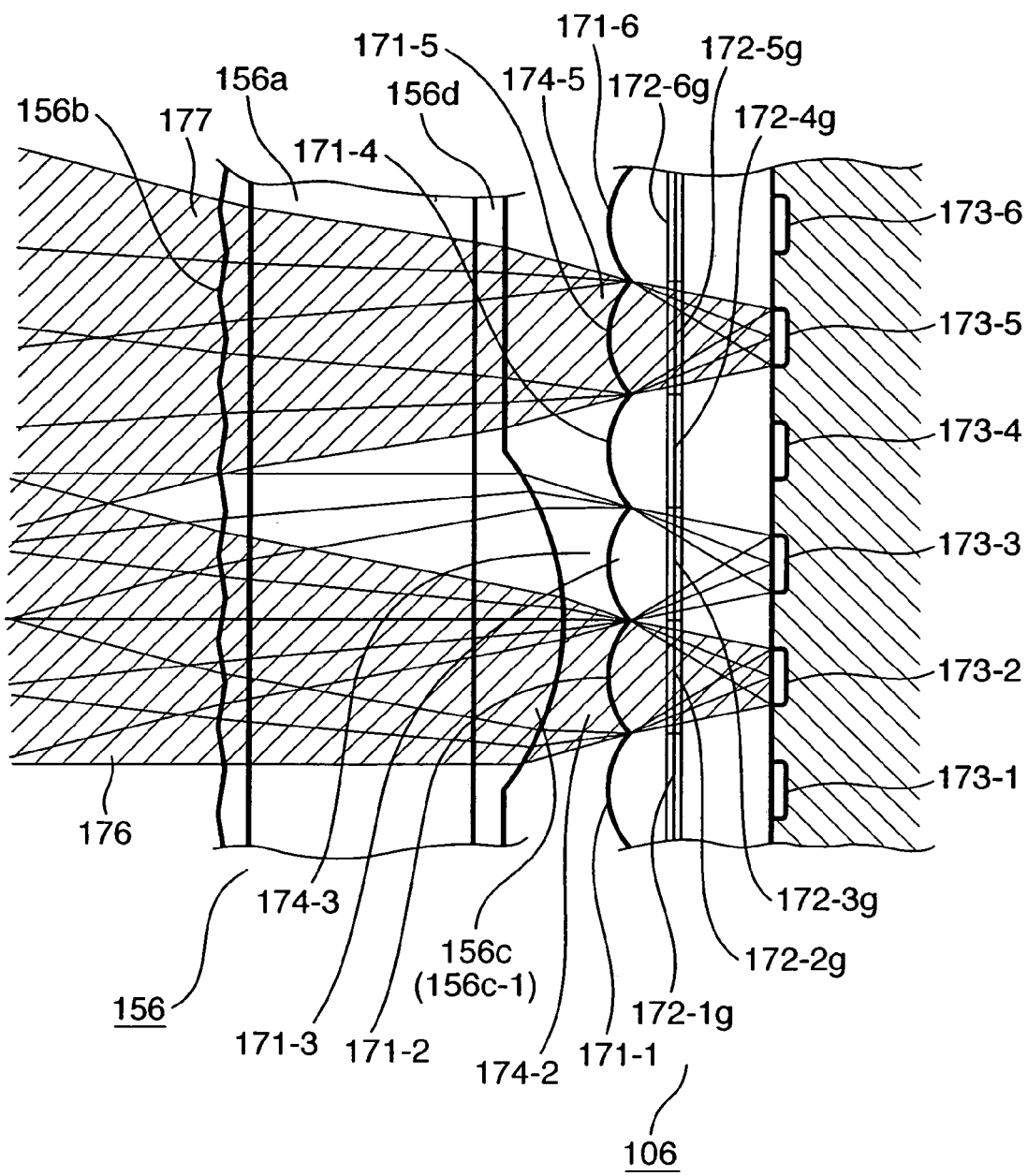
FIG. 6 is a sectional view showing the second optical arrangement state in which light strikes the image sensing device after being transmitted through a lens array plate.

FIG. 6 is a sectional view showing a state wherein light beams emerging from the imaging optical system 103 are incident on the image sensing device 106 through the lens array plate 156. The lens array plate 156 is inserted to a position near the image sensing device 106 in FIG. 5. Since the image sensing device 106 has already been described with reference to FIG. 5, the lens array plate 156 and its function will be described in detail below.

Referring to FIG. 6, reference numeral 156 denotes the lens array plate; 156a, the substrate glass of the lens array plate; 156b, an optical low-pass filter added to the substrate glass 156a by a manufacturing method such as a replica method or printing method; 156c, a lens formed on the substrate glass 156a by the replica method; and 156d, a flat portion formed on the substrate glass 156a by the replica method. In this case, the replica method is a manufacturing technique of additionally forming a given shape on a substrate having a simple shape with a resin and integrating them. In general, an ultraviolet curing resin or thermosetting resin is used. The resin is sandwiched between a mold and glass as a substrate. The resin is irradiated with ultraviolet light to be cured, thereby transferring the shape of the mold onto the glass. The optical low-pass filter 156b is used to add a stronger low-pass effect, unlike a filter originally incorporated in an optical path of the imaging optical system, in order to cope with a situation in which image sensing operation is not performed by using all the pixels of the image sensing device 106 in the second optical arrangement state.

The lens 156c can also be regarded as an optical element.

Manufacturing the lens array plate 156 by the replica method can reduce the manufacturing cost. A resin generally has a relatively high coefficient of linear expansion and a low Young's modulus. Integrating such a resin and a glass substrate having a relatively low coefficient of linear expansion and a high Young's modulus will suppress heat distortion and reduce a positional offset due to a temperature change with respect to the image sensing device 106 generally formed by using a crystal silicon base. This indicates that this lens array plate can be used in a wide temperature range.

On the light exit surface of the lens array plate 156, the lenses 156c and the flat portions 156d which are gap portions between the lenses are formed, through which light beams reaching the pixels for focus detection and light beams reaching the pixels for display are independently transmitted.

Figure 7:
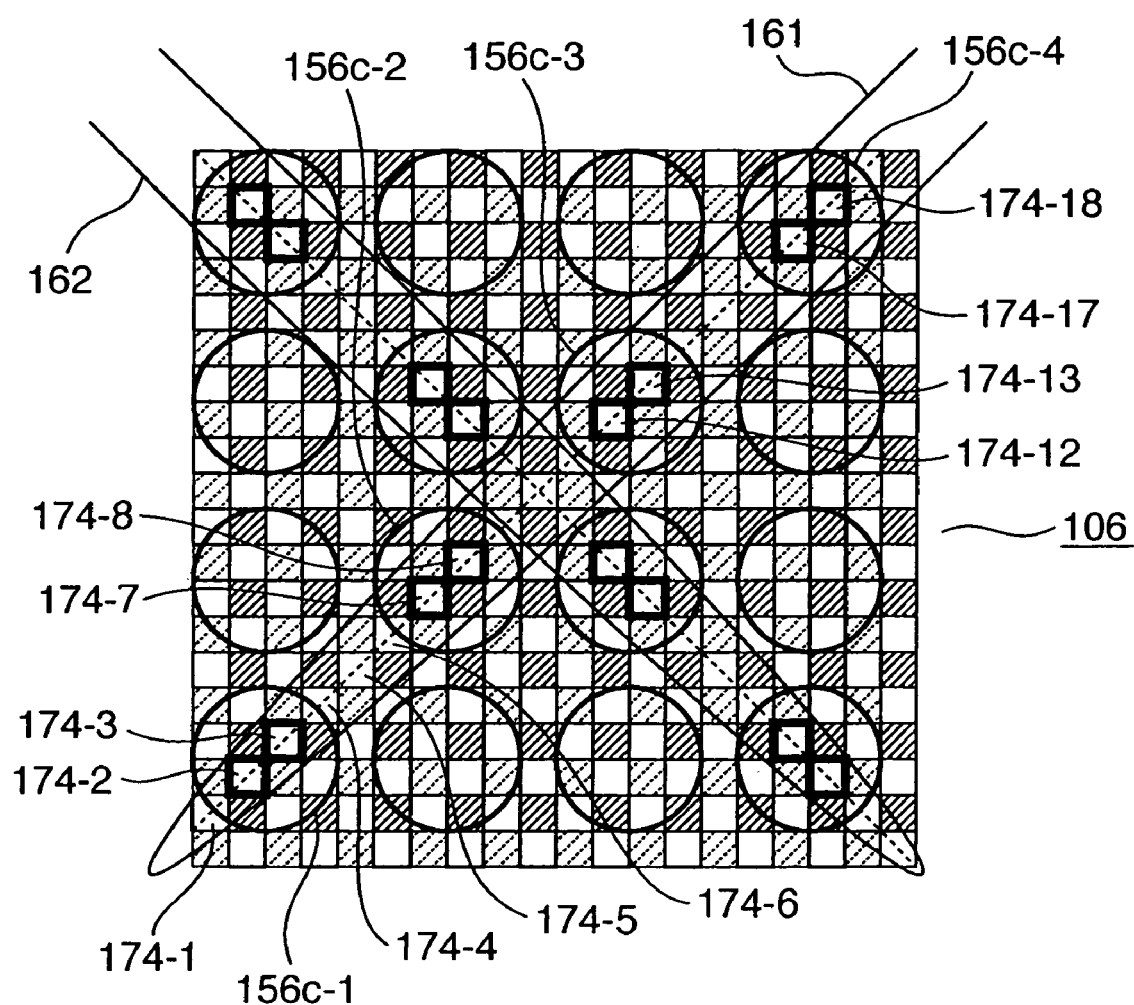
FIG. 7 is a plan view showing the lens array plate and image sensing device in a superimposed state.
Figure 8:
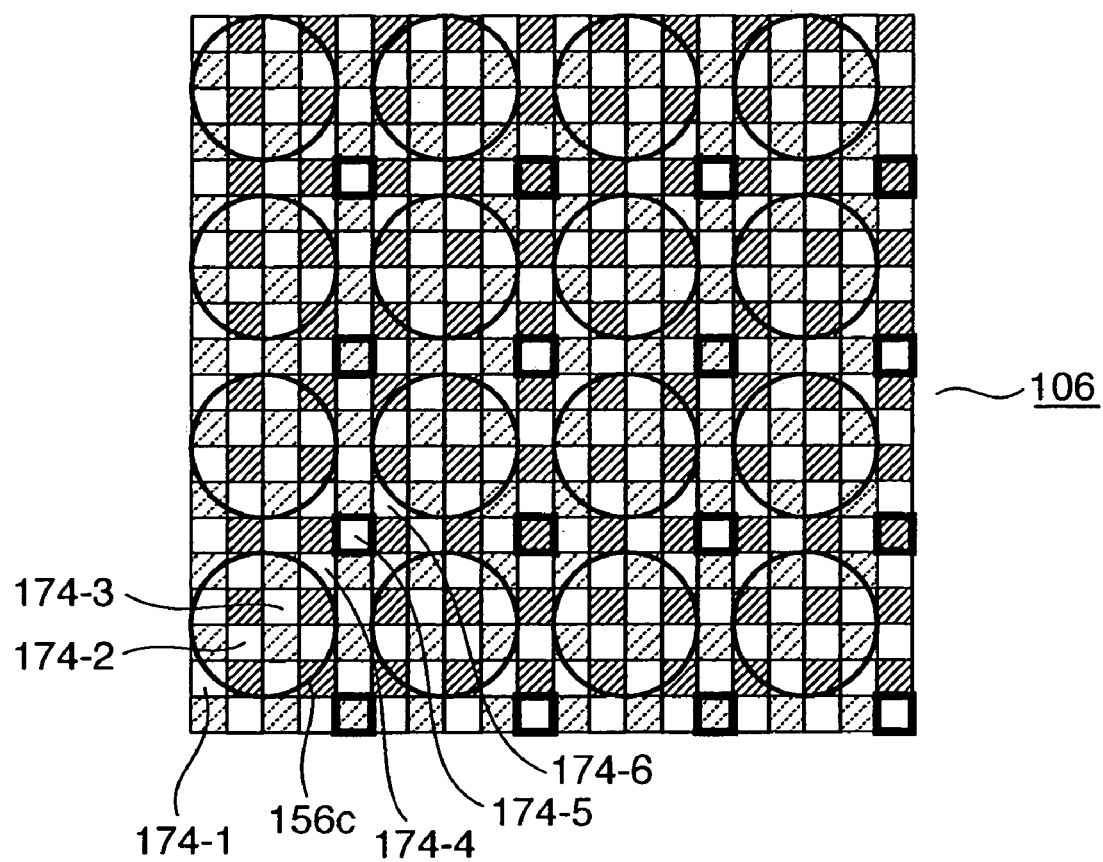
FIG. 8 is a plan view showing the lens array plate and image sensing device in a superimposed state.

Each of FIGS. 7 and 8 is a plan view of the lens array plate 156 and image sensing device 106 in a superimposed state. Each of FIGS. 7 and 8 is an enlarged view of some of the many pixels of the image sensing device, in which light beams are incident from the upper surface side of the drawing.

Pixel used for focus detection will be described first with reference to FIG. 7.

Referring to FIG. 7, the pixels 174-1 to 174-6 are the same pixels as those shown in the sectional view of FIG. 5. The pixels with the thick frames represent pixels used for focus detection. Of the pixels 174-1 to 174-6 in FIG. 5, the pixels 174-2 and 174-3 correspond to such pixels.

The lenses 156c of the lens array plate 156 are regularly formed at a pitch five times that of the pixels of the image sensing device 106 in both the vertical and horizontal directions; the ratio of the number of lenses 156c to the number of pixels is 1:25. Since the lens array plate 156 has a size that makes it cover the entire surface of the image sensing device 106, the number of lenses 156c is 400,000 with respect to 10,000,000 pixels of the image sensing device 106.

An incident optical path to the light-receiving unit of each pixel used for focus detection has a shape like that shown in FIG. 6. Light beams that are incident on any pixels are transmitted through the lenses 156c of the lens array plate 156. Consequently, as indicated by a hatched portion 176 representing a light beam received by the pixel 174-2 as a representative, a pixel located on the lower right of the lens 156c in FIG. 6 receives a light beam from the upper left in FIG. 6. In contrast, a pixel located upper right of the lens 156c, like the pixel 174-3, receives a light beam from the lower left in FIG. 6.

Such an optical path is formed for each lens 156c throughout the entire frame of the image sensing device 106, in which a pixel located on the lower right of the lens 156c receives a light beam from the upper left in FIG. 6, whereas a pixel located on the upper right of the lens 156c receives a light beam from the lower left in FIG. 6. Since each of the sectional views of FIGS. 5 and 6 is taken in the direction to cross the pixel array of the image sensing device 106 at 45°, each optical path in FIG. 6 indicates that a corresponding focus detection pixel receives a light beam from a semicircular pupil formed by obliquely dividing the pupil of the imaging optical system 103.

A focus detection visual field and signal processing will be described next.

The pixel array {174-2, 174-3, 174-7, 174-8, 174-12, 174-13, 174-17, 174-18, . . . } indicated by an ellipse 161 in FIG. 7 is a focus detection pixel array forming a focus detection visual field. All the pixels constituting the pixel array have green transmission color filters.

In the first step in focus detection signal processing, the pixels are classified according to the respective areas on the pupil of the imaging optical system 103 to divide the pixel array into two groups. The pixels 174-2 and 174-3 corresponding to the lens 156c-1, the pixels 174-7 and 174-8 corresponding to the lens 156c-2, the pixels 174-12 and 174-13 corresponding to the lens 156c-3, the pixels 174-17 and 174-18 corresponding to the pixel 156c-4, . . . are pairs of pixels, each discriminated on an area on the pupil of the imaging optical system 103. One pair of signal outputs can be obtained, for each set of a plurality of lenses 156c, from the image sensing device 106 which has received light beams through the lens 156c.

That is, these outputs constitute one pair of image sensing device signal outputs formed, for each set of a plurality of optical elements of the optical element array, from light beams received through the optical element.

A focus detection signal is generated by obtaining a reconstruction pixel array {174-2, 174-7, 174-12, 174-17, . . . } and a reconstruction pixel array {174-3, 174-8, 174-13, 174-18, . . . } from the above pixels and processing the signal output waveforms from these pixel arrays. That is, reconstruction pixel arrays are formed by concatenating a plurality of pixels, of the plurality of pixels of the image sensing device 106, which are discretely positioned, and a focus detection signal is formed by using signal output value arrays obtained in this manner. More specifically, a state wherein signal output waveforms from two reconstruction pixel arrays are relatively shifted laterally is observed in accordance with the imaging state of an object image formed on a focus detection visual field by the photographing lens 102. The shifting directions of signal output waveforms are reversed depending on whether the camera is in a near-focus state or far-focus state. The principle of focus detection lies in detecting this phase difference (shift amount) by using a technique such as correlation computation.

Note that high focus detection precision can be maintained even during movement of an object by photoelectrically converting focus detection image signals within one focus detection visual field at substantially the same timing.

If a focus detection visual field is set in the longitudinal or lateral direction, red transmission color filters or blue transmission color filters can be provided for pixel arrays. In this case, after the pixels are classified according to the respective types of color filters, the resultant pixels are further classified according to the respective areas on the pupil to form reconstruction pixel arrays.

By setting a focus detection visual field at an arbitrary position on the image sensing device 106 and checking changes in the relative positions of a pair of image signals, the imaging state of the imaging optical system 103 at this position can be known.

Assume that a pixel array of focus detection pixels indicated by an ellipse 162 is simultaneously extracted in addition to the array indicated by the ellipse 161 in FIG. 7.

In this case, even if an object image pattern parallel to one pixel array is projected and no amplitude is generated in the signal output waveform to result in a failure of focus detection based on the pixel array, an amplitude is generated in a signal output waveform from the other pixel array to allow focus detection.

Phase difference detection in focus detection signal processing will be described. Assume that the signal output value array obtained from the reconstruction pixel array {174-2, 174-7, 174-12, 174-17, . . . } is the first image sensing device signal output waveform, and the signal output value array obtained from the reconstruction pixel array {174-3, 174-8, 174-13, 174-18, . . . } is the second image sensing device signal output waveform. In this case, focus detection processing is performed by using a computation means for detecting a relative position change, i.e., a phase difference, between the first image sensing device signal output waveform formed from light beams passing through an area separated from the exit pupil of the imaging optical system 103 and the second image sensing device signal output waveform formed from light beams passing through the other area separated from the exit pupil of the imaging optical system.

Figure 9:
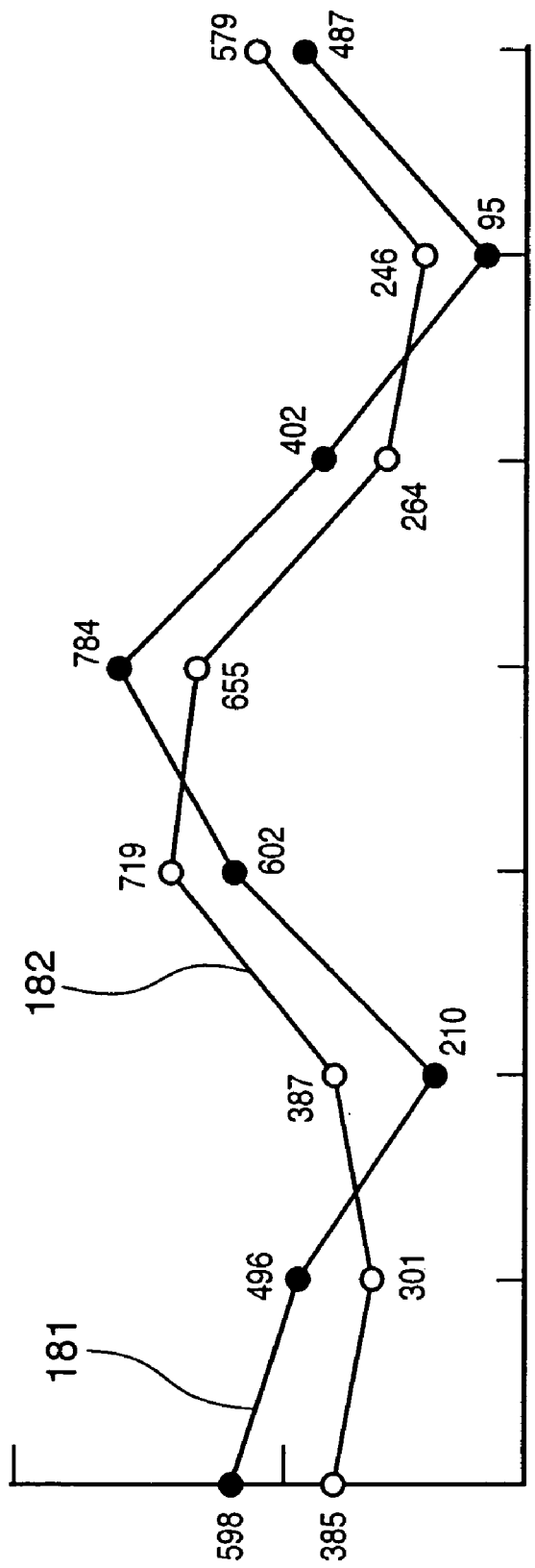
FIG. 9 is a graph showing a digital signal of an image input to an AF control unit.
Figure 10:
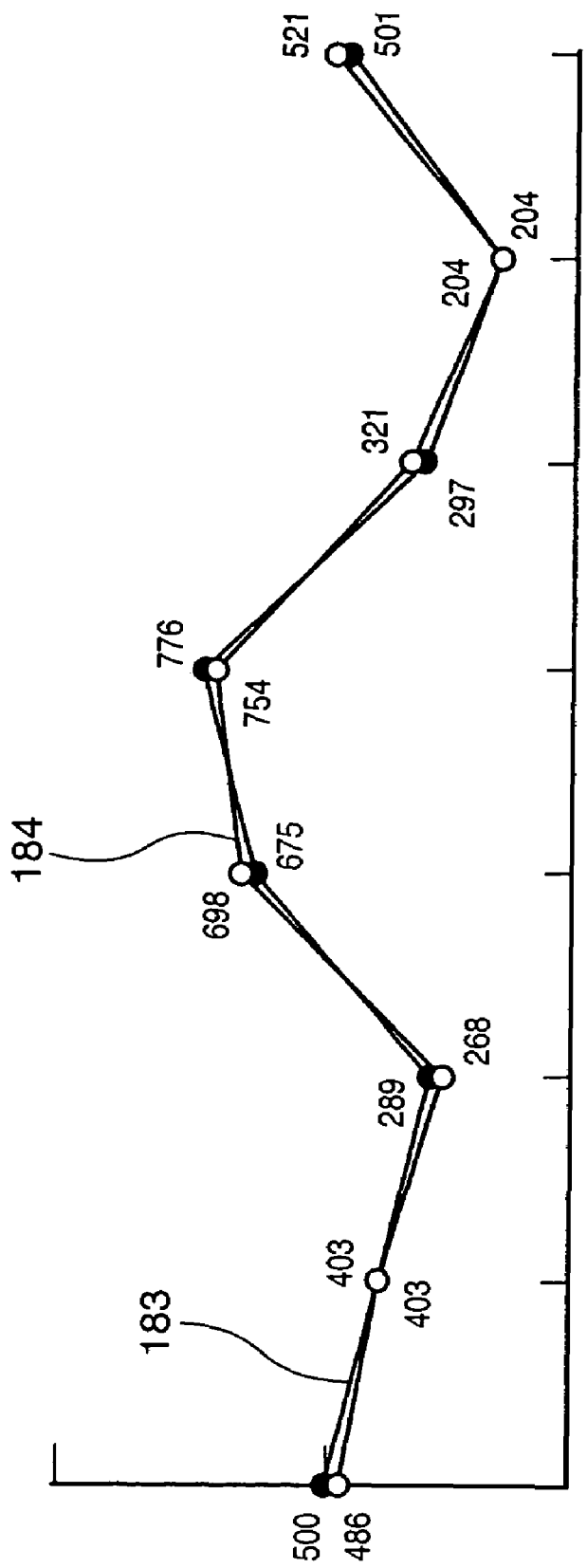
FIG. 10 is a graph showing a digital signal of an image input to an AF control unit.

FIGS. 9 and 10 are graphs showing image signals which are the values of image sensing device signal output values arrays input to the AF pupil area 40. FIG. 9 shows image sensing deice signal output waveforms in a state wherein an object image is out of focus. FIG. 10 image sensing deice signal output waveforms in a state wherein an object image is in focus.

Referring to FIG. 9, an image sensing device signal output waveform 181 corresponds to the signal output value array {598, 496, 210, 602, 784, 402, 95, 487} obtained from the reconstruction pixel array {174-2, 174-7, 174-12, 174-17, . . . }, and an image sensing device signal output waveform 182 corresponds to the signal output value array {385, 301, 387, 719, 655, 264, 246, 579} obtained from the reconstruction pixel array {174-3, 174-8, 174-13, 174-18, . . . }. In the state shown in FIG. 9, since the object image is out of focus, the image sensing device signal output waveform 181 does not coincide with the image sensing device signal output waveform 182; they are relatively shifted laterally.

Referring to FIG. 10, an image sensing device signal output waveform 183 corresponds to the signal output value array {500, 403, 289, 675, 776, 297, 204, 501} obtained from the reconstruction pixel array {174-2, 174-7, 174-12, 174-17, . . . }, and an image sensing device signal output waveform 184 corresponds to the signal output value array {486, 403, 268, 698, 754, 321, 204, 521} obtained from the reconstruction pixel array {174-3, 174-8, 174-13, 174-18, . . . }. In the state shown in FIG. 10, since the object image is in focus, the image sensing device signal output waveform 181 substantially coincides with the image sensing device signal output waveform 182.

An in-focus state can therefore be detected by determining the equality of a pair of signals. A defocus amount can be obtained by detecting a phase difference using a known technique using correlation computation, for example, the technique disclosed in Japanese Patent Publication No. 05-088445. More specifically, a focus detection signal is generated by using a pair of image sensing device signal output value arrays in which the phases of signal output waveforms change in accordance with the imaging state of the imaging optical system 103 which forms an object image on the image sensing device 106. Converting the obtained defocus amount into an amount by which the focusing lens of the imaging optical system 103 should be driven makes it possible to realize automatic focus adjustment. Since the amount by which the lens should be driven can be known in advance, the lens can be driven to an in-focus position by almost one driving operation, thus realizing very fast focus adjustment.

In the second optical arrang ment state, acquisition of an image output with a small data amount which is used for display is allowed in addition to focus detection. FIG. 8 is a view for explaining pixels to be used to obtain an image output for display.

Referring to FIG. 8, reference numerals 174-1 to 174-6 denote pixels which are identical to those shown in FIG. 5. The pixels indicated by the thick lines are pixels used to obtain an image output with a small data amount. Of the pixels 174-1 to 174-6, the pixel 174-5 is such a pixel.

An incident optical path to the light-receiving unit of a pixel used to obtain an image output with a small data amount passes through the flat portion 156d of the lens array plate 156, as shown in FIG. 6. Consequently, as indicated by a hatched portion 177 representing a light beam received by the pixel 174-5 as a representative, this incident optical path has almost the same width as that of a hatched portion 175 representing a light beam received by the pixel 174-2 in FIG. 5. That is, this arrangement differs from the first optical arrangement state without the lens array plate 156 only in a reduction in high spatial frequency components due to the effect of the optical low-pass filter 156b and a slight optical path length difference due to the difference in refractive index between the lens array plate 156 and air. That is, in the second optical arrangement, light beams are received from the entire pupil of the imaging optical system 103.

Since such an optical path is formed for each flat portion 156d throughout the frame of the image sensing device 106, all the pixels placed behind the flat portions 156d according to the positional relationship shown in FIG. 6 receive light beams from the entire pupil of the imaging optical system 103. That is, when light beams are received through the lens array constituted by a plurality of lenses 156c incorporating a plurality of pixels of the image sensing device 106, an image signal can be formed on the basis of outputs from the pixels which receive the light beams through the gaps between the plurality of lenses 156c formed on the lens array.

In general, when an image is to be displayed on the display apparatus 107, it is required to achieve uniformity in depth of field between an optical image and a display image and realize a small display time lag between the instant at which an object image is captured and the instant at which the image is displayed on a liquid crystal spatial modulation device or the like, compared to display of an image with a resolution as high as that of an image to be printed.

When this image is displayed on the display apparatus 107, since light beams are received from the entire pupil, the same defocus state of the image as that of a high-resolution image sensed in the first optical arrangement state can be obtained. Therefore, an aperture effect of, for example, emphasizing a main object by defocusing the background can be fully known by observing an image on the display apparatus 107.

When the second optical arrangement state is switched to the first optical arrangement state for capturing high-resolution images by retracting the lens array plate 156, the imaging optical system 103 becomes out of focus to an extent corresponding to the optical path length difference between the lens array plate 156 and air. However, since this optical path length difference is a known fixed value, the focus of the imaging optical system 103 may be corrected by a predetermined amount in synchronism with the timing of the retraction of the lens array plate 156.

In addition, since the data amount of an image is small, the processing time is short, and the time lag between an optical image and a display image is very small. Therefore, smooth moving images at about 60 frames per sec can also be displayed. Although the data amount is small, sufficient image quality for TV broadcasting can be obtained, and hence image sensing equipment for both still images/moving images may be formed by using this image sensing apparatus.

Referring back to FIG. 8, consider the array of pixels indicted by the thick lines. Since these pixels are arranged for every five pixels in both the vertical and horizontal directions, the arrangement of these extracted pixels becomes a Beyer arrangement. Therefore, signal processing for the acquisition of a color image is the same as that for the acquisition of a high-resolution image in the first optical arrangement state. This allows the signal processing circuit to be commonly used in both the first and second optical arrangement states.

The above description has exemplified the case wherein the lens array plate 156 manufactured by the replica method is used as an optical element array. However, the present invention is not limited to this. For example, an optical element array can be formed from a gradient index lens or liquid crystal lens. Since either optical element array requires only a small mechanism space, compact image sensing equipment can be realized. When a liquid crystal lens is to be used, the liquid crystal may be electrically controlled instead of mechanical driving of the lens array plate. This can further save a mechanism space.

Second Embodiment

Figure 12:
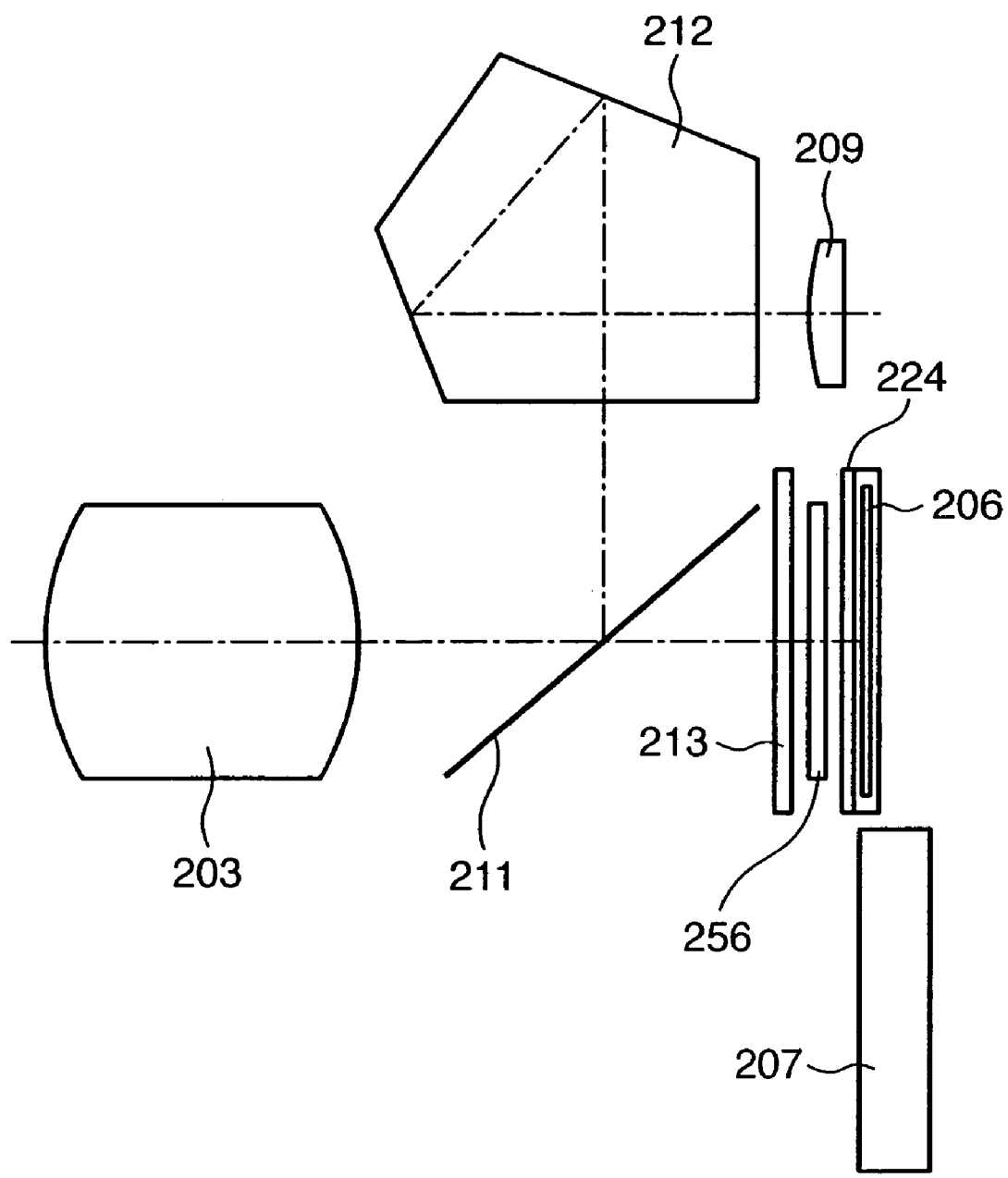
FIG. 12 is a sectional view of a camera taken in the lateral direction.
Figure 13:
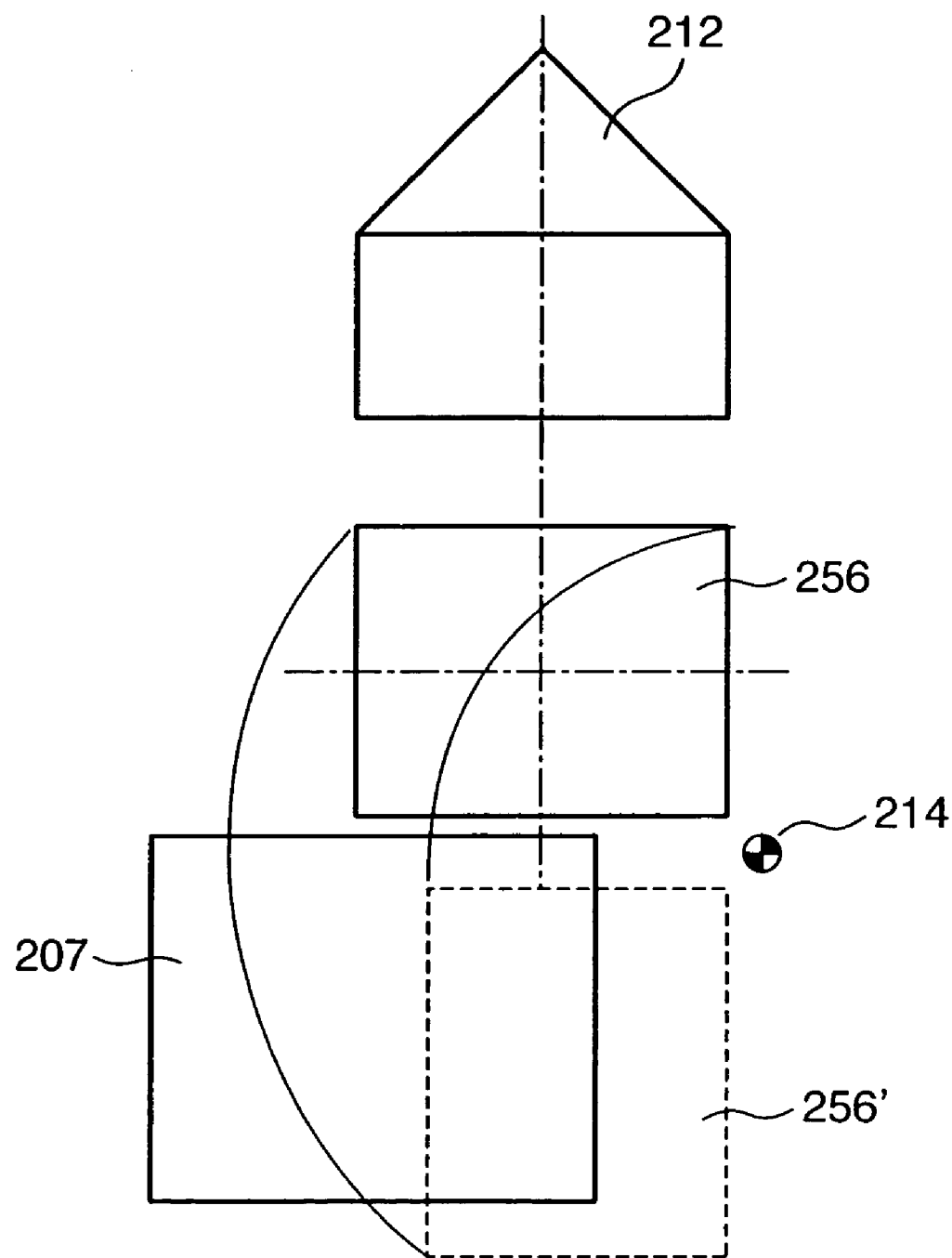
FIG. 13 is a front perspective view of the camera when viewed from the left in FIG. 12.

FIGS. 12 and 13 are views showing the schematic arrangement of a digital color camera incorporating an image sensing apparatus according to the second embodiment of the present invention. FIG. 12 is a sectional view of the camera taken in the lateral direction. FIG. 13 is a front perspective view of the camera when viewed from the left side in FIG. 12. This camera is a single-CCD digital color camera which uses an image sensing device such as a CCD or CMOS sensor. The camera obtains an image signal representing a moving or still image by continuously or sporadically driving the image sensing device. In this case, the image sensing device is an area sensor of a type that converts exposed light into an electrical signal for each pixel, stores electric charges corresponding to the light amount, and outputs the electric charges.

Referring to FIG. 12, reference numeral 203 denotes an imaging optical system which has a driving mechanism (not shown) and is focused on an object by moving a focusing lens as an element of the imaging optical system 203 along the optical axis direction or forming a focusing lens using a transparent, elastic member with flexibility or a liquid lens and changing its refractive power by changing its interface form.

Reference numeral 206 denotes an image sensing device. The image sensing device 206 is housed in a package having a cover glass 224 serving as a window member through which light is received. An optical low-pass filter (not shown) which limits the cutoff frequency of the imaging optical system 203 so as not to form spatial frequency components of an object image which have excessive frequencies on the image sensing device 206 is provided in an optical path from the imaging optical system 203 to the image sensing device 206. An infrared cut filter is also placed in the imaging optical system 203.

A lens array plate 256 is retractably placed in front of the light-receiving surface of the image sensing device 206 so as to be adjacent to the package of the image sensing device 206. The image sensing apparatus includes the image sensing device 206, the lens array plate 256, and an electrical circuit which generates image signals and focus detection signals. The lens array plate 256 is a thin plate having a size that makes it possible to cover the entire surface of the image sensing device 206 when the plate is inserted to a position before the image sensing device 206.

The object image captured by the image sensing device 206 is displayed on a display apparatus 207. The display apparatus 207 is mounted on the rear surface of the camera and allows direct observation. The display apparatus 207 is preferably formed from an organic EL spatial modulation device, liquid crystal spatial modulation device, a spatial modulation device using electrophoresis of particles, or the like because they are low in power consumption.

The image sensing device 206 is a CMOS process compatible sensor (to be simply referred to as a CMOS sensor hereinafter) which is one of amplification type solid-state image sensing devices. One of the characteristic features of the CMOS sensor is that the number of masks and the number of process steps can be greatly decreased as compared with a CCD because MOS transistors in an area sensor unit and MOS transistors in a peripheral circuit can be formed in the same step. Another characteristic feature of this sensor is that it allows random access to an arbitrary pixel. As a color filter arrangement, a Beyer arrangement is used.

The image sensing device 206 performs focus detection operation, display image output operation, and high-resolution image output operation by using such characteristic features.

Unlike in the first embodiment, the lens array plate 256 is located outside the package of the image sensing device 206 and is not housed in the package together with the image sensing device 206. A driving mechanism for the lens array plate 256 can be selected from various kinds of mechanisms. For example, a rotational driving mechanism constituted by an electromagnetic motor and a gear train can be used. Reference numeral 214 denotes the rotating shaft of the mechanism for driving the lens array plate 256. The lens array plate 256 is moved to the position indicated by 256' by the rotational driving mechanism (not shown) to retract from the image sensing device 206. Note that the image sensing device 206 does not require any special structure including its package, and hence can be obtained more easily at a lower price than the image sensing device in the first embodiment.

Reference numeral 211 denotes a half mirror which splits an optical path from the imaging optical system 203 to make a split light beam strike the optical finder; 212, a pentaprism; and 209, a convex lens for the observation of an optical finder image.

The electrical arrangement of the digital color camera is basically the same as that in the first embodiment.

The rotational driving mechanism constituted by the electromagnetic motor and gear train (not shown) extends and retracts the lens array plate 256 to and from the image sensing device 206 to switch between the first optical arrangement state, in which a light beam from the imaging optical system 203 is caused to be directly incident on the image sensing device 206, and the second optical arrangement state, in which a light beam is caused to be incident on the image sensing device 206 upon being transmitted through the lens array plate 256. The position indicated by the lens array plate 256' corresponds to the first optical arrangement state, whereas the position indicated by the lens array plate 256 corresponds to the second optical arrangement state. The first optical arrangement state is used to generate a high-resolution image suitable for a large-size print or the like. The second optical arrangement state is used to generate a signal for focus detection and an image signal with a relatively small amount of data for display.

Since the first and second optical arrangement states can be switched, focus adjustment, monitoring of a sensed image on the display apparatus, and image sensing of a high-resolution image can be performed by using signals from a single image sensing device. In addition, high-speed focus adjustment based on the phase difference detection scheme can be realized simultaneously with a small time lag and smooth moving image display. The main photographing sequence in the digital color camera is the same as that in the first embodiment. This apparatus switches, as needed, between the first optical arrangement state, in which the image sensing device receives light without through the optical element array constituted by a plurality of optical elements incorporating a plurality of pixels of the image sensing device, and the second optical arrangement state, in which the image sensing device receives light through the optical element array.

Figure 14:
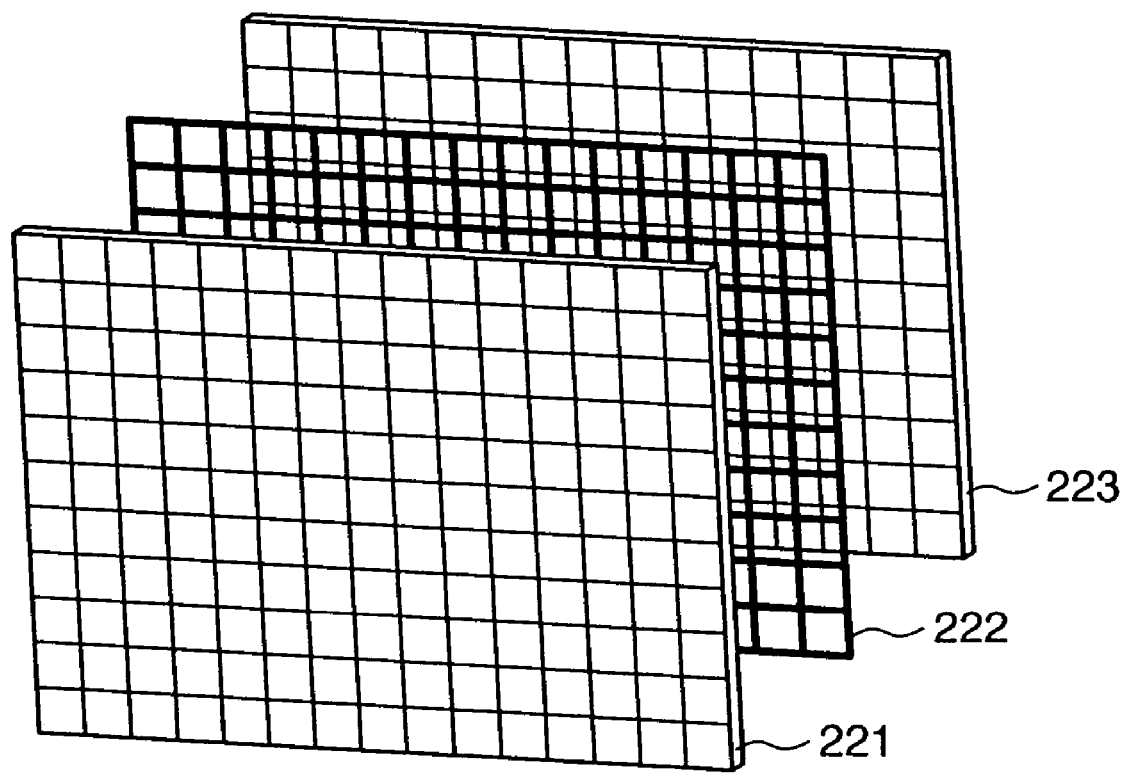
FIG. 14 is an exploded perspective view of the lens array plate.

The structures of the image sensing device 206 and lens array plate 256 will be described next. FIG. 14 is an exploded perspective view of the lens array plate 256 as an optical element array.

The lens array plate 256 has a three-layer structure and is constituted by a condenser lens array plate 221, partition assembly 222, and re-imaging lens array plate 223 arranged from the light incident side in the order named. One of the optical units partitioned by the partition assembly 222 is a re-imaging optical system which forms a flat surface of the condenser lens array plate 221 which is in contact with the light incident plane into an image on the image sensing device 206. That is, the optical element array is constituted by a plurality of juxtaposed re-imaging optical systems. A re-imaging plane is divided into small areas, and compact re-imaging optical systems are arranged in correspondence with the respective areas. Therefore, the overall structure is in the form of a thin plate, and requires a very small mechanism space.

The imaging optical system 203 forms an object image near the image sensing device 206. After focus adjustment, the imaging optical system 203 forms an object image on the image sensing device 206. The object image formed on the condenser lens array plate 221 by the imaging optical system 203 is formed again on the image sensing device 206 by the lens array plate 256. In many cases, the object image formed on the condenser lens array plate 221 is out of focus. In addition, in focusing operation, an out-of-focus image is always subjected to re-imaging operation. In focus detection based on the phase difference detection scheme, since this operation can be done by only setting an initial phase difference, no problem arises.

Figure 15:
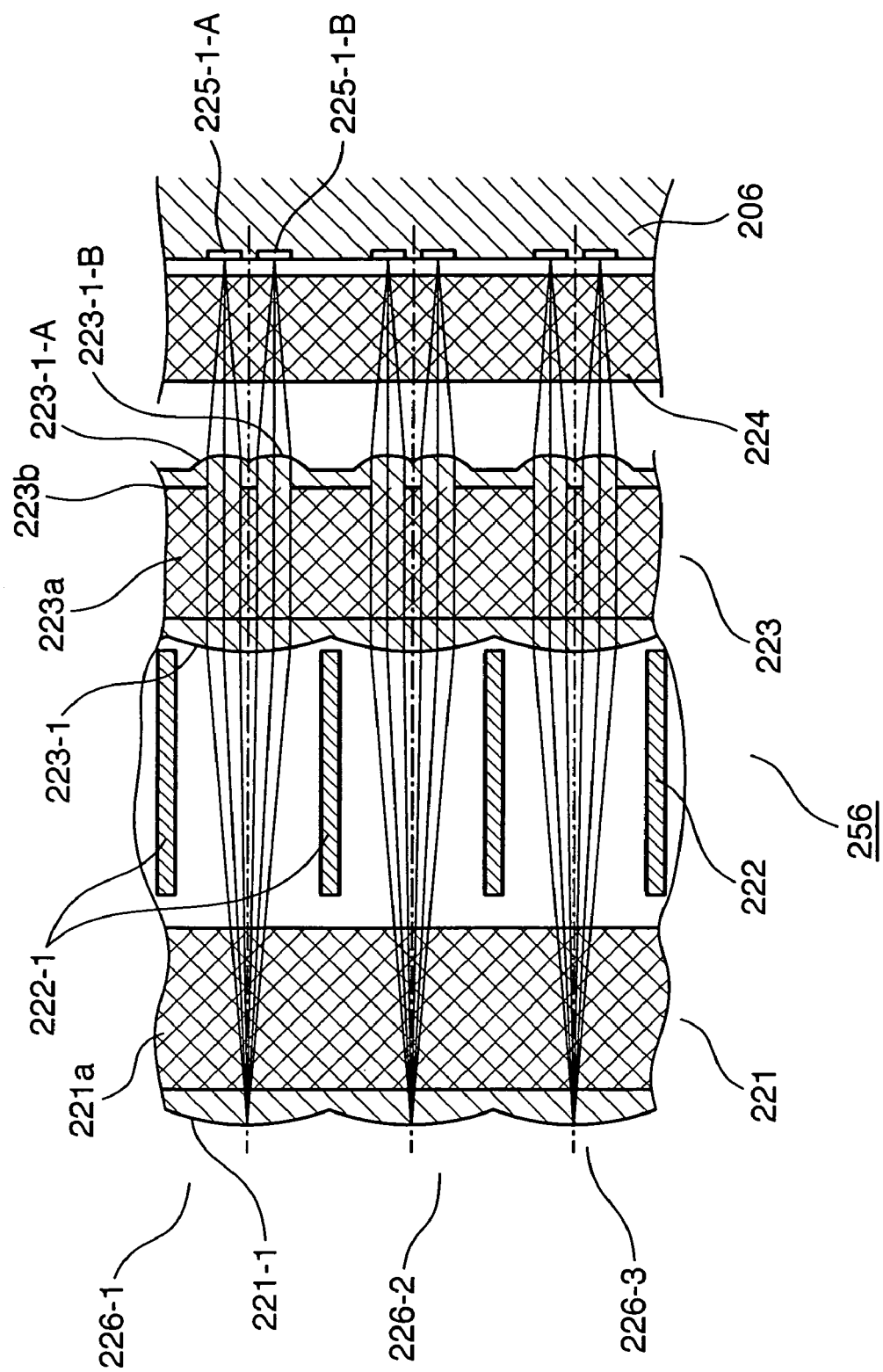
FIG. 15 is a partial sectional view of the lens array plate and image sensing device.

FIG. 15 is a partial sectional view for explaining the structures of the lens array plate 256 and image sensing device 206 in more detail. Referring to FIG. 15, light beams propagate from left to right.

The condenser lens array plate 221 is obtained by forming lens portions on a flat substrate glass 221*a* by the replica method. A lens portion (e.g., 221-1) convexes on the incident side to become a so-called condenser lens for efficiently guiding light to a re-imaging lens of the re-imaging lens array plate 223 located behind. There is no gap between adjacent lens portions, and hence the object image formed on the condenser lens array plate is guided to the image sensing device 206 without being blocked.

The re-imaging lens array plate 223 is obtained by forming lens portions on a flat substrate glass 223a by the replica method as in the case of the condenser lens array plate 221. However, the re-imaging lens array plate 223 differs from the condenser lens array plate 221 in that lens portions are formed on the upper and lower surfaces of the substrate glass. Each re-imaging lens of the re-imaging lens array plate 223 has a biconvex lens structure which has one optical axis on the light incident surface side and four optical axes on the light exit surface side. This lens forms, on the image sensing device 206, four object images corresponding to the number of axes on the exit side.

Figure 16:
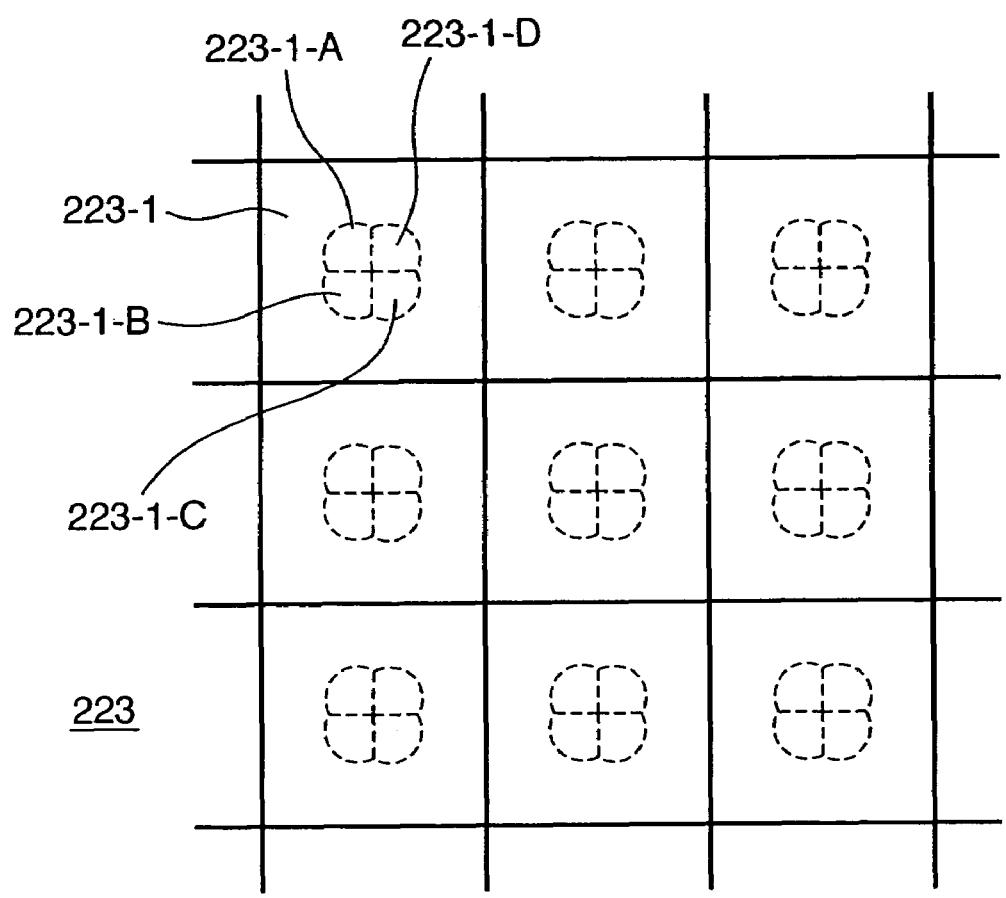
FIG. 16 is a plan view of a re-imaging lens array plate when viewed from the light incident surface.

FIG. 16 is a plan view of the re-imaging lens array plate 223 when viewed from the light incident surface, showing the positional relationship between an incident-side lens portion 223-1 and exit-side lens portions 223-1-A, 223-1-B, 223-1-C, and 223-1-D.

Four stop apertures 223b are formed on the light exit side of the flat substrate glass 223a by using a multilayer deposition film made of chromium oxide and chromium, which guide light passing therethrough to each of the above four-axis lenses. Note that since a light-shielding stop is available, a thermosetting resin is used for the replica method on the exit surface side, and the shape of a mold is transferred by heat.

The light beam which is transmitted through the lens portion 221-1 of the condenser lens array plate 221 and emerges from the flat substrate glass 221a strikes the lens portion 223-1 of the re-imaging lens array plate 223 and passes through the stop 223b of the flat substrate glass 223a to emerge from the lens portions 223-1-A, 223-1-B, 223-1-C, and 223-1-D. Note that FIG. 15 shows only the lens portions 223-1-A and 223-1-B.

The light beam emerging from the lens array plate 256 is transmitted through the cover glass 224 of the package of the image sensing device 206 and reaches the area sensor area of the image sensing device 206.

As described above, the re-imaging optical systems are constituted by condenser lenses, stop apertures, and re-imaging lenses, and are densely arranged.

Figure 17:
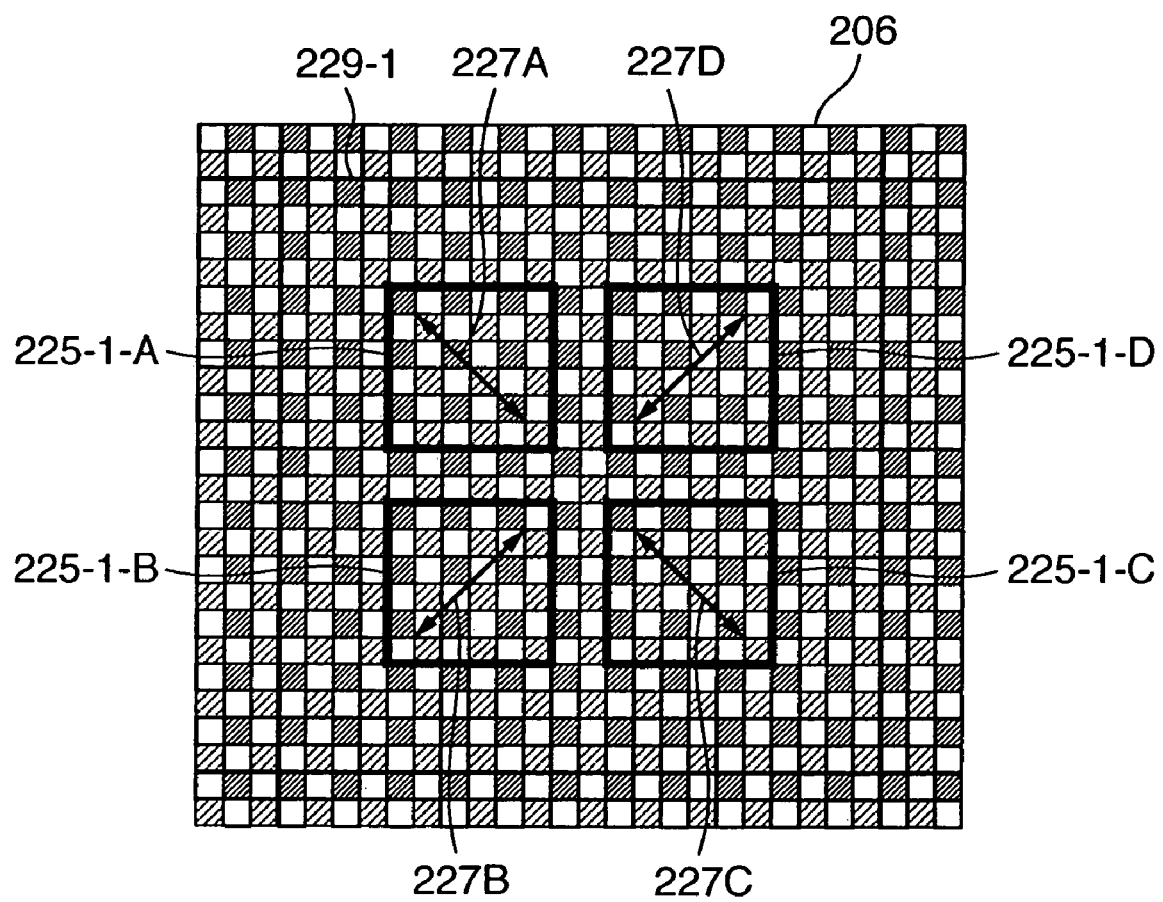
FIG. 17 is a plan view showing how object images are projected on the image sensing device.

FIG. 17 is a plan view showing the state of the object image projected on the image sensing device 206.

An area 229-1 is equal in size to one re-imaging optical system 226-1 (221-1, 222-1, 223-1, 223-1-A, 223-1-B, 223-1-C, and 223-1-D) when it is projected. Areas each equal in size to this area are densely arranged without any gap.

Reference numerals 225-1-A, 225-1-B, 225-1-C, and 225-1-D denote images of the peripheries of the lens portions 221-1 of the condenser lens array plate 221 which are formed by the re-imaging optical system. Four images are formed owing to the effects of the lens portions 223-1-A, 223-1-B, 223-1-C, and 223-1-D of the re-imaging lens array plate 223. The object image formed on a flat surface in contact with the lens portion 221-1 is formed again inside each of the four images by the imaging optical system 203. Note that reference symbols A, B, C, and D indicating the lens portions of the re-imaging lens array plate 223 correspond to reference symbols A, B, C, and D representing the images.

Since the images of the peripheries of the four lens portions 221-1 of the condenser lens array plate 221 are formed in the space on which one re-imaging optical system is projected, a re-imaging magnification $\beta$ needs to be at least $$\beta \geq -0.5$$

However, in order to suppress leakage of light between adjacent images, the magnification is preferably $$\beta \geq -0.4$$

In addition, if the magnification is set to $$-0.1 \geq \beta$$

in order to increase the number of pixels to be used for focus detection, high focus detection precision can be maintained. Therefore, the re-imaging magnification $\beta$ is preferably set in the range of −0.1 to −0.4, and more preferably to about 0.25.

Since the lens portions 221-1 of the condenser lens array plate 221 project the stops 223b onto the pupil of the imaging optical system 203, four images 225-1-A, 225-1-B, 225-1-C, and 225-1-D are images formed by light beams passing through different pupil areas of the imaging optical system 203. Consider therefore the two images 225-1-A and 225-1-C. When the imaging state of the object imaged by the imaging optical system 203 changes, these images approach or move away from each other as indicated by arrows 227A and 227C. These images are photoelectrically converted to obtain one pair of image sensing device signal outputs based on light beams received, for each set of a plurality of optical elements of the optical element array, through the optical elements. Consider next the two remaining images 225-1-B and 225-1-D to obtain another pair of image sensing device signal outputs based on the images moving in the directions indicated by arrows 227B and 227D.

Note that each of the images 225-1-A, 225-1-B, 225-1-C, and 225-1-D is an object image formed by one re-imaging optical system 226-1, and only part of the luminance distribution of the object image is projected within this size. That is, an amplitude appears in a signal output only when an object image contains a sufficiently high frequency component, which is a contingent event. When a luminance distribution with a low spatial frequency is extracted by a short window, the resultant signal output contains no amplitude. Obviously, it is impossible to detect a phase difference in the object image in this state.

A focus detection visual field is therefore expanded by concatenating output values from a plurality of pixels, of the pixels of the image sensing device, which are located discretely, thereby facilitating capturing the luminance distribution of an object.

Figure 18:
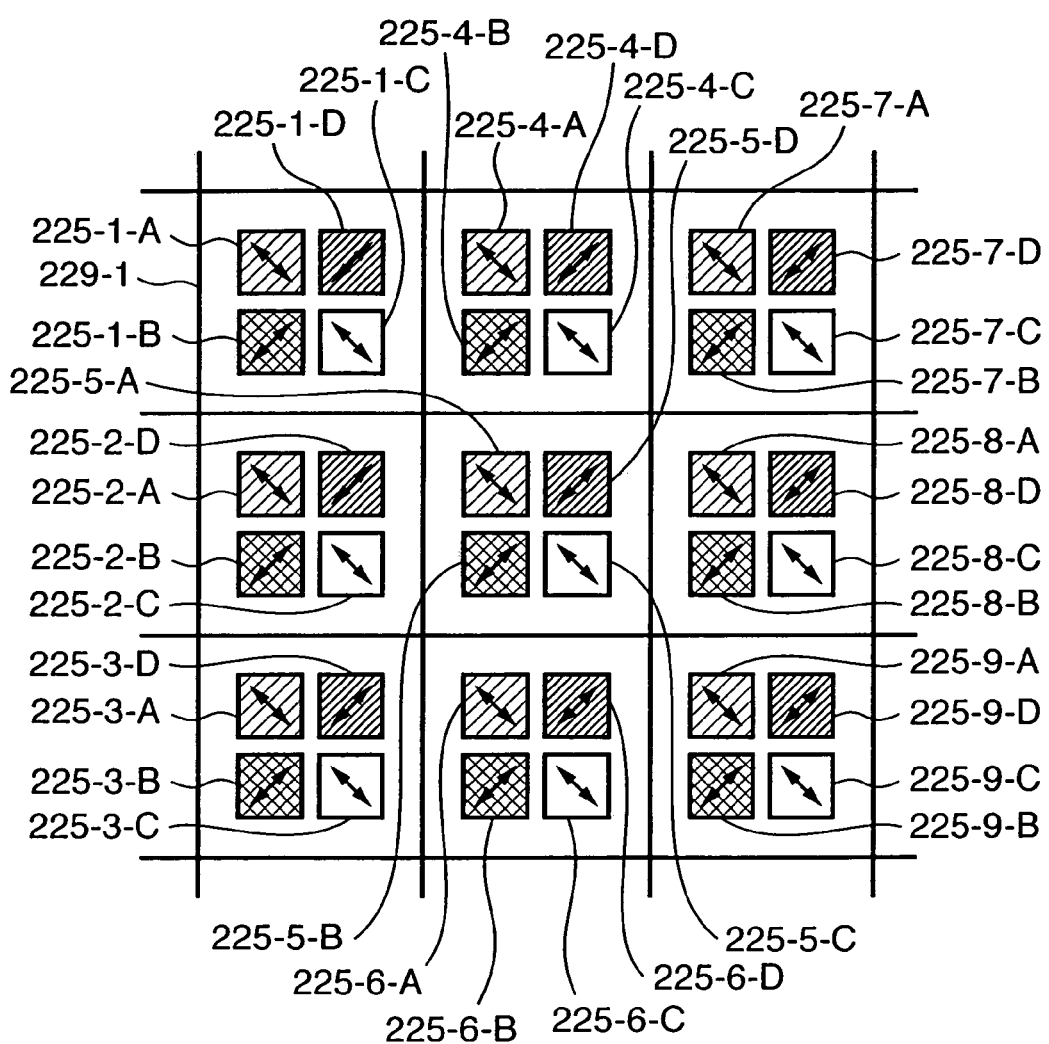
FIG. 18 is a plan view showing how object images are projected on the image sensing by nine re-imaging optical systems.

FIG. 18 is a plan view showing how object images are projected on the image sensing device 206 by a plurality of re-imaging optical systems, 3×3=9 re-imaging optical system in this case.

The object images described with reference to FIG. 17 are shown on the upper left in FIG. 18. In order to discriminate areas on the pupil of the imaging optical system 203 through which imaging light beams pass, the images projected by lens portions A, B, C, and D are indicated by different hatchings.

In order to expand the focus detection visual field, pixel outputs at the positions where object images are projected may be concatenated. To allow pixel outputs to be concatenated, the following conditions are required for two object images to be photoelectrically converted by two target pixel arrays:

(1) The two object images should be images obtained by forming a continuous surface into images on an object-side plane conjugate to an imaging plane of a re-imaging optical system.

(2) The two object images should be images formed by light beams passing through the same area on the pupil of the imaging optical system 203.

Figure 19:
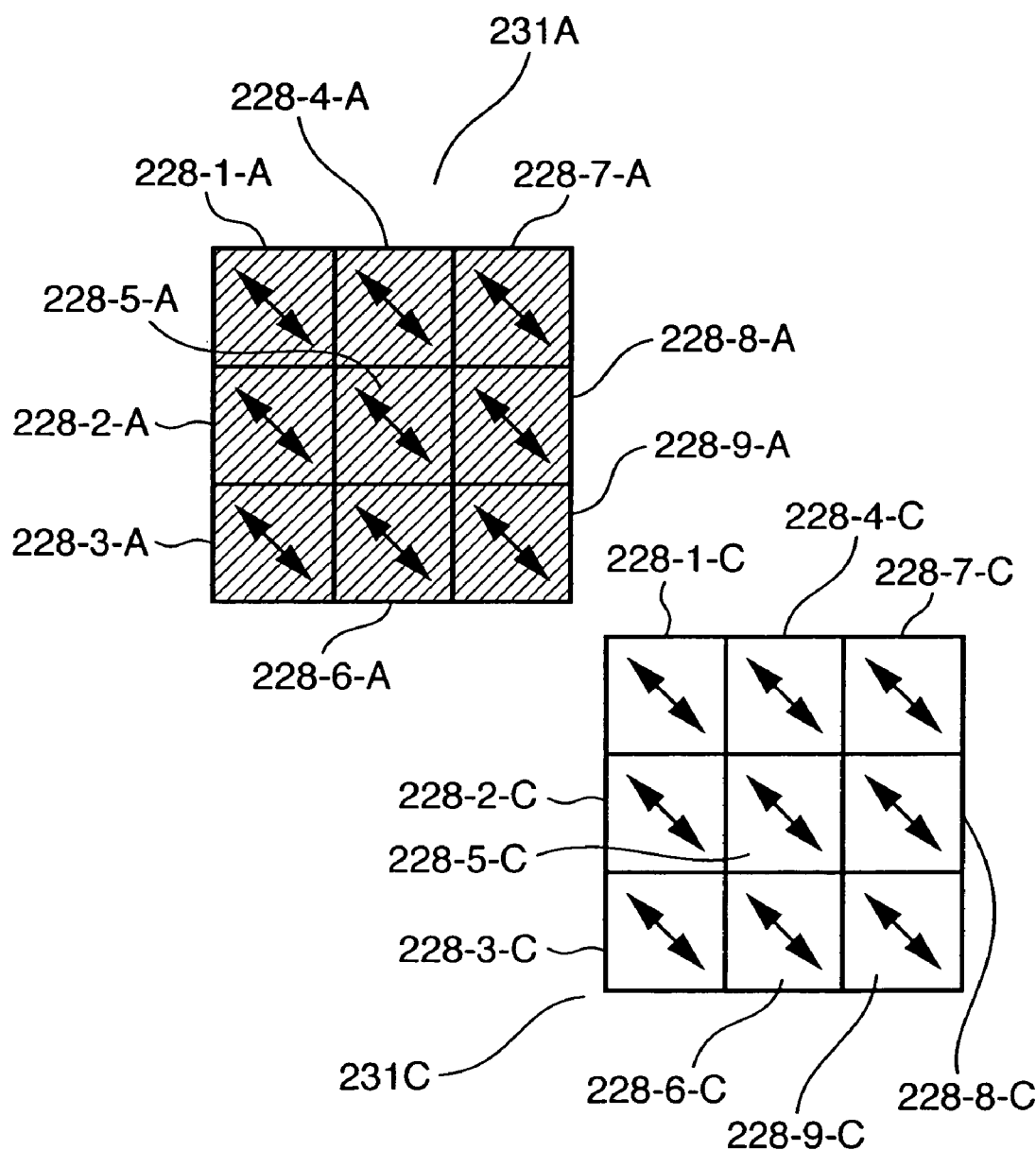
FIG. 19 is a view for explaining how output values of pixel arrays at the positions where object images are projected are concatenated in terms of computation processing.
Figure 20:
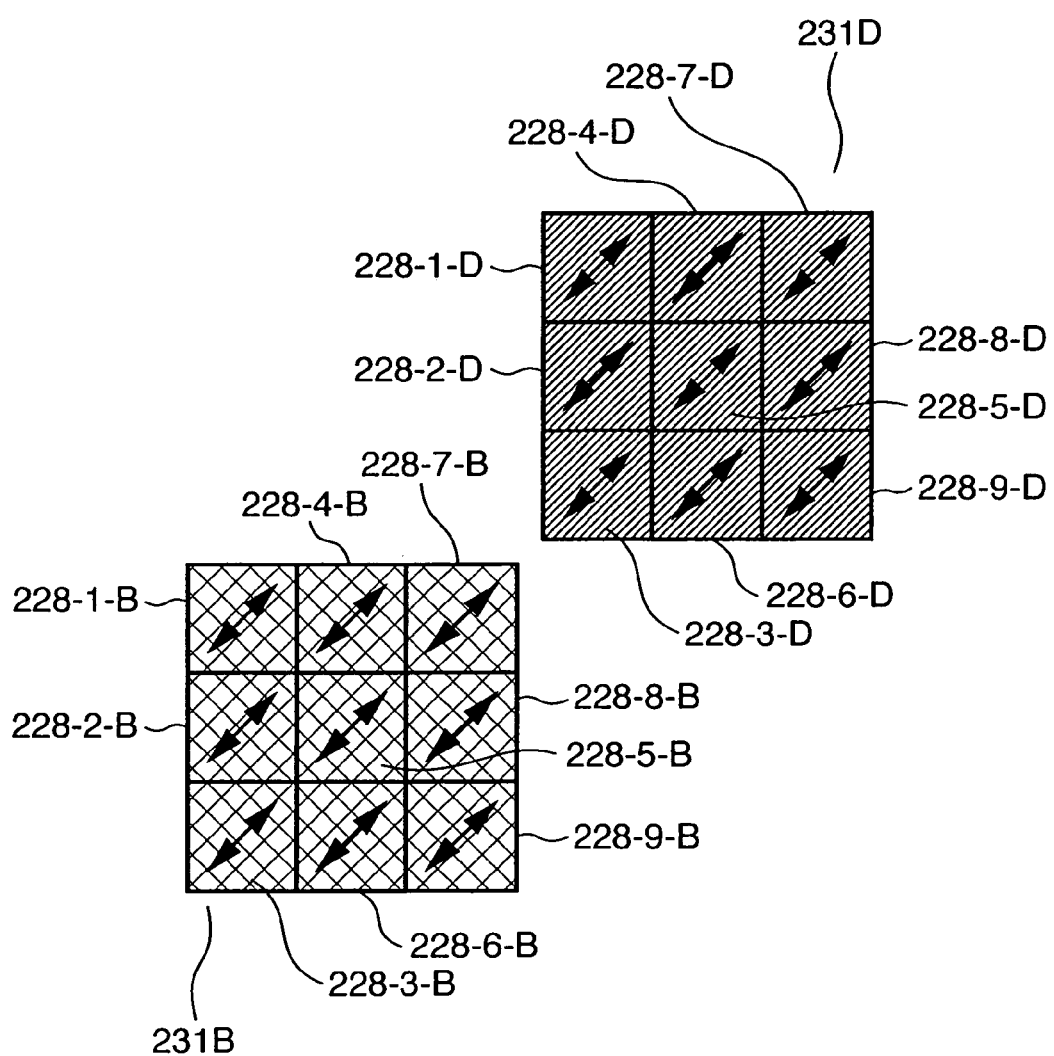
FIG. 20 is a view for explaining how output values of pixel arrays at the positions where object images are projected are concatenated in terms of computation processing.

Each of FIGS. 19 and 20 is a view for explaining a state wherein output values from pixel arrays at the positions where object images are projected are concatenated in terms of computation processing in order to satisfy these conditions.

Referring to FIGS. 19 and 20, for example, reference numeral 228-1-A denotes a signal output value array from a pixel array for photoelectrically converting the object image 225-1-A in FIG. 18. In this case, a two-dimensional array is used for focus detection to obtain high detection precision.

Referring to FIG. 19, the signal output value arrays with reference symbols A and C are expanded to form data arrays 231A and 231C as a whole. The images move from the upper left to the lower right in FIG. 19, and these movements are reflected in the output values. Referring to FIG. 20, the signal output value arrays with reference symbols B and D are expanded to form data arrays 231B and 231D as a whole. The images move from the lower left to the upper right in FIG. 20, and these movements are reflected in the output values. Each of the data arrays 231A, 231C, 231B, and 231D contains data having a meaning as a continuous whole.

Assume that the movements of images in two directions are captured as shown in FIGS. 19 and 20. In this case, even if an object image pattern parallel to one pixel array is projected and no amplitude is generated in the signal output waveform to result in a failure of focus detection based on the pixel array, an amplitude is generated in a signal output waveform from the other pixel array to allow focus detection.

Figure 21:
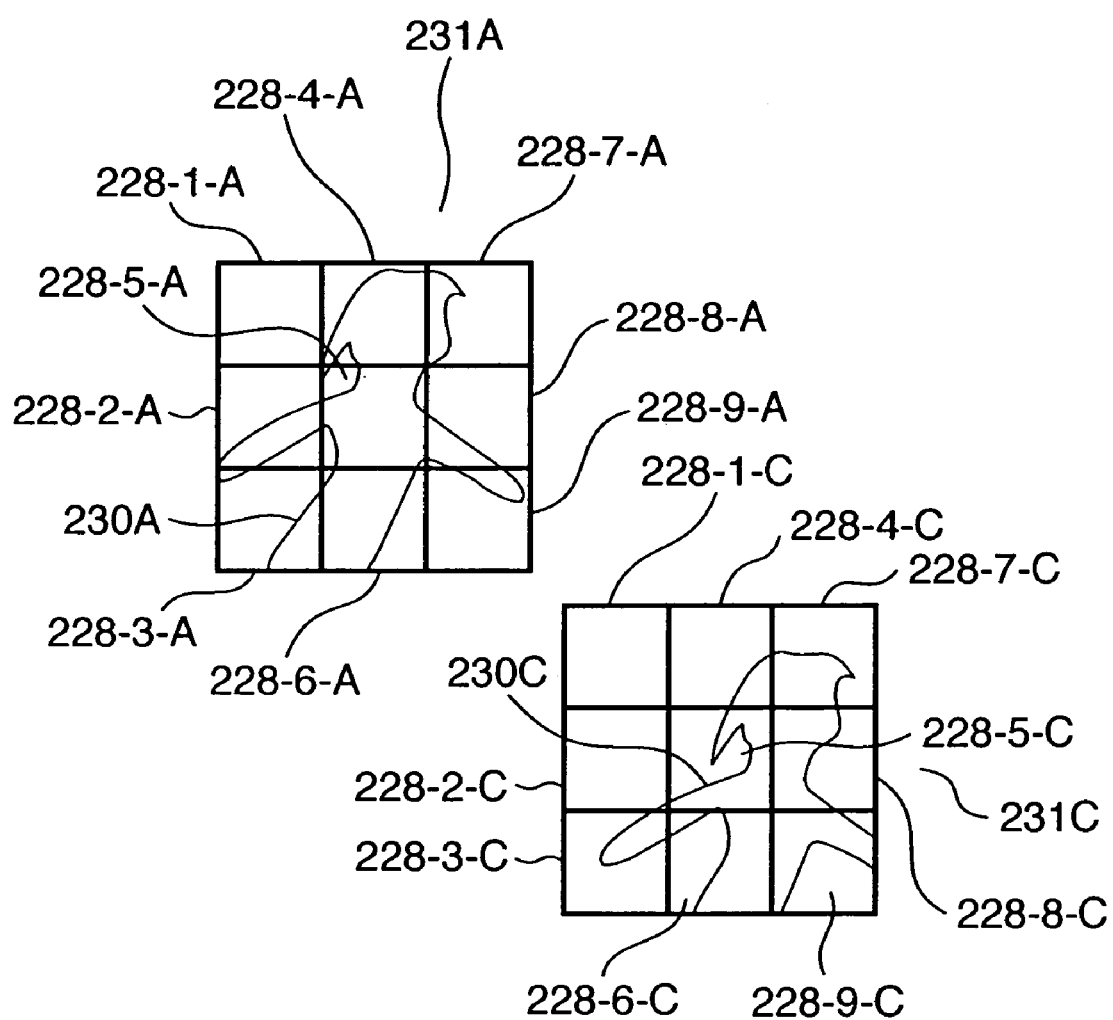
FIG. 21 is a view for explaining signal output value arrays while imaging optical systems are capturing human features and focus adjustment is tried.

FIG. 21 is a view for making it easier to understand how each data array contains data having a meaning as a continuous whole. FIG. 21 shows, for example, how the imaging optical system 203 captures a human figure and focus adjustment is tried.

The signal output value arrays shown in FIG. 19 contain the values obtained by photoelectrically converting human images 230A and 230C. When the above two conditions are satisfied in this manner, even if output values from discontinuous areas on the image sensing device 206 are concatenated, a continuous signal can be obtained.

Although focus adjustment of the imaging optical system 203 is tried, the object images 230A and 203C on the signal output value arrays 231A and 231C differ in position for the following reason.

A re-imaging optical system (226-1, 226-2, 226-3, . . . ) forms the object image formed on a flat surface in contact with the lens portion 221-1 of the condenser lens array plate 221 into an image on the image sensing device 206 again. When the lens array plate 256 retracts from the image sensing device 206 to the position indicated by 256' in FIG. 13, the focus adjustment of the imaging optical system 203 is performed to form a clear object image on the image sensing device 206. Therefore, while the focus adjustment of the imaging optical system 203 is done with respect to the image sensing device 206, the object image on the flat surface in contact with the lens portion 221-1 of the condenser lens array plate 221 becomes slightly out of focus. As a consequence, the object image data in the signal output value arrays 231A and 231C have pieces of information corresponding to positions located slightly far from each other, as shown in FIG. 21. If, however, this phase difference is stored as an initial phase difference and is subtracted from the detected phase difference, no problem arises in actual focus detection processing.

Since the image sensing device has the respective types of color filters, a phase difference may be detected for each color filter type or may be detected by using a given luminance signal.

As described above, pixel outputs at the positions where the images 225-1-A, 225-1-B, 225-1-C, 225-1-D, 225-2-A, 225-2-B, 225-2-C, 225-2-D, 225-3-A, 225-3-B, 225-3-C, 225-3-D, . . . are projected are extracted, and a state wherein signal output waveforms from are relatively shifted laterally is observed by using the signal output value arrays obtained by concatenating the extracted outputs, thereby checking the positional relationships between the images. This makes it possible to know the imaging state of the imaging optical system 203. That is, an in-focus state can be detected by determining uniformity between one pair of signals. A defocus amount can be obtained by detecting a relative position change amount using a known technique using correlation computation, for example, the technique disclosed in Japanese Patent Publication No. 05-088445. Converting the obtained defocus amount into an amount by which the focusing lens of the imaging optical system 203 should be driven makes it possible to realize automatic focus adjustment. Since the amount by which the lens should be driven can be known in advance, the lens can be driven to an in-focus position by almost one driving operation, thus realizing very fast focus adjustment.

A composite signal output value array for forming a focus detection visual field can be set from output values from an arbitrary position on the image sensing device 206.

In the second optical arrangement state, acquisition of an image output with a small data amount which is used for display or the like is allowed in addition to focus detection. For display, adding data at the positions corresponding to the signal output value arrays 231A, 231B, 231C, and 231D shown in FIGS. 19a and 20 into one new data array makes it possible to equivalently obtain the image data formed by photoelectrically converting object images formed by uniformly using the pupil of the imaging optical system 203. If this computation processing is performed throughout the image sensing device 206, in particular, an image suitable for monitoring a high-resolution image to be sensed can be obtained. Since the data amount is small, the processing time is short, and the display time lag between the instant at which an object image is captured and the instant at which the image is displayed on a liquid crystal spatial modulation device or the like can be reduced.

When the second optical arrangement state is switched to the first optical arrangement state for capturing high-resolution images by retracting the lens array plate 256, the imaging optical system 203 becomes out of focus to an extent corresponding to the optical path length difference between the lens array plate 256 and air. However, since this optical path length difference is a known fixed value, the focus of the imaging optical system 203 may be corrected by a predetermined amount in synchronism with the timing of the retraction of the lens array plate 256.

In contrast, if no function of monitoring images is required and it suffices if focus detection can be performed, the lens array plate 256 need not have a size that makes it cover the entire surface of the image sensing device 206, and may be required to cover, for example, 50% of the area of the central portion.

The above description has exemplified the color camera. Obviously, however, the present invention is not limited to this and can be applied to infrared image sensing equipment and monochrome camera.

As has been described above, according to the above embodiments, an image sensing apparatus which satisfies both the requires for focus detection performance and high-resolution, high image quality can be realized.

In addition, an image sensing apparatus which can concurrently perform focus detection operation and image display operation by using a signal image sensing device can be realized.

Furthermore, a compact image sensing apparatus can be realized.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:
   an image sensing device having a plurality of pixels;
   an optical element array having a plurality of optical elements made to correspond one by one to each set of a plurality number of pixels of a plurality of pixels of said image sensing device; and
   a focusing device which generates, for each of the plurality of optical elements, one pair of focus detection signals in the pixels from light passing through the optical element, and performs focusing operation on the basis of focus detection signals generated in pairs for each of the optical elements,
   wherein image signals are generated in the pixels from light passing through gaps between the optical elements of said optical element array.

2. The apparatus according to claim 1, wherein the optical element comprises a re-imaging optical system.

3. The apparatus according to claim 1, further comprising a switching device which switches between a first state in which light is received by said image sensing device without through said optical element array and a second state in which light is received by said image sensing device through said optical element array.

4. The apparatus according to claim 1, wherein the focusing operation is performed by using signals generated by concatenating the focus detection signals obtained from a plurality of pixels, of the plurality of pixels of said image sensing device, which are arranged discretely.

* * * * *